(12) United States Patent
Saiki et al.

(10) Patent No.: US 7,006,641 B1
(45) Date of Patent: Feb. 28, 2006

(54) DRIVING CIRCUIT, ELECTRO-MECHANICAL-ACOUSTIC TRANSDUCER, AND PORTABLE TERMINAL APPARATUS

(75) Inventors: Shuji Saiki, Nara (JP); Sawako Usuki, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/548,119

(22) Filed: Apr. 12, 2000

(30) Foreign Application Priority Data

| Apr. 14, 1999 | (JP) | ................................. 11-106250 |
| Apr. 27, 1999 | (JP) | ................................. 11-119443 |
| Nov. 22, 1999 | (JP) | ................................. 11-331216 |

(51) Int. Cl.
*H03G 5/00* (2006.01)

(52) U.S. Cl. ........................... 381/98; 340/7.2; 340/7.6; 340/384.72

(58) Field of Classification Search ................ 381/162, 381/164, 151, 98; 340/384.72, 7.6, 7.58, 340/407.1, 384.5, 384.7, 384.73, 384.6, 384.71, 340/7.2

See application file for complete search history.

(56) References Cited

U.S. PATENT DOCUMENTS

| 4,700,390 | A | * | 10/1987 | Machida ...................... 704/500 |
| 5,076,260 | A | * | 12/1991 | Komatsu ...................... 601/59 |
| 5,271,062 | A | * | 12/1993 | Sugita et al. ................ 381/71.3 |
| 5,524,061 | A | * | 6/1996 | Mooney et al. .............. 381/151 |
| 6,023,515 | A | * | 2/2000 | McKee et al. .............. 381/150 |
| 6,208,237 | B1 | * | 3/2001 | Saiki et al. ................ 340/388.1 |

FOREIGN PATENT DOCUMENTS

| EP | 0 845 928 A2 | 6/1998 |
| JP | 8275293 | 10/1996 |

* cited by examiner

*Primary Examiner*—Vivian Chin
*Assistant Examiner*—Con P. Tran
(74) *Attorney, Agent, or Firm*—Snell & Wilmer L.L.P.

(57) ABSTRACT

A circuit of the present invention is a driving circuit for driving a vibrator having a mechanical vibration system which resonates at a resonance frequency. The driving circuit outputs to the vibrator at least two signals of different frequencies which are included in a frequency range including the resonance frequency. The vibrator has a function of converting an electric signal into at least one of a sound and a vibration.

54 Claims, 27 Drawing Sheets

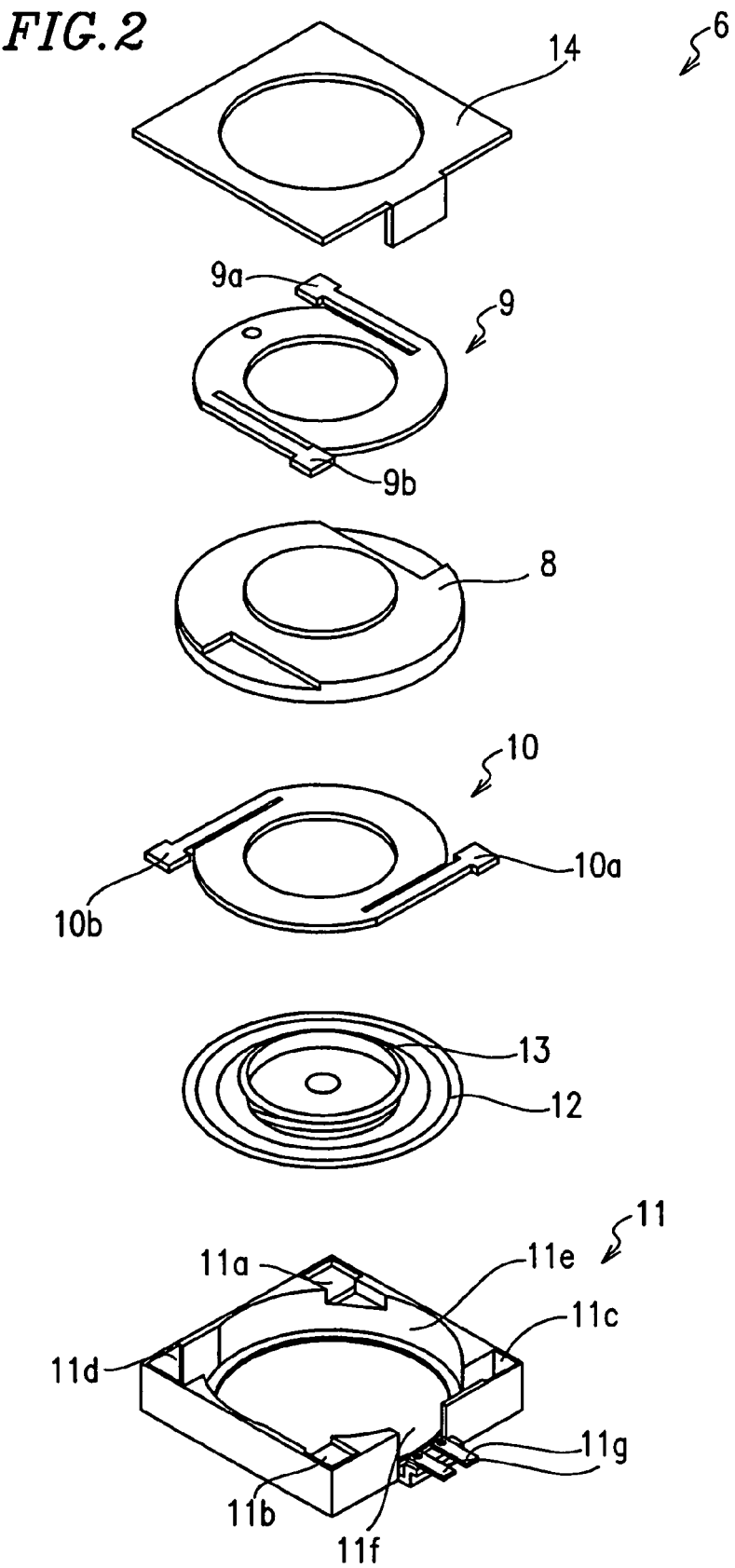

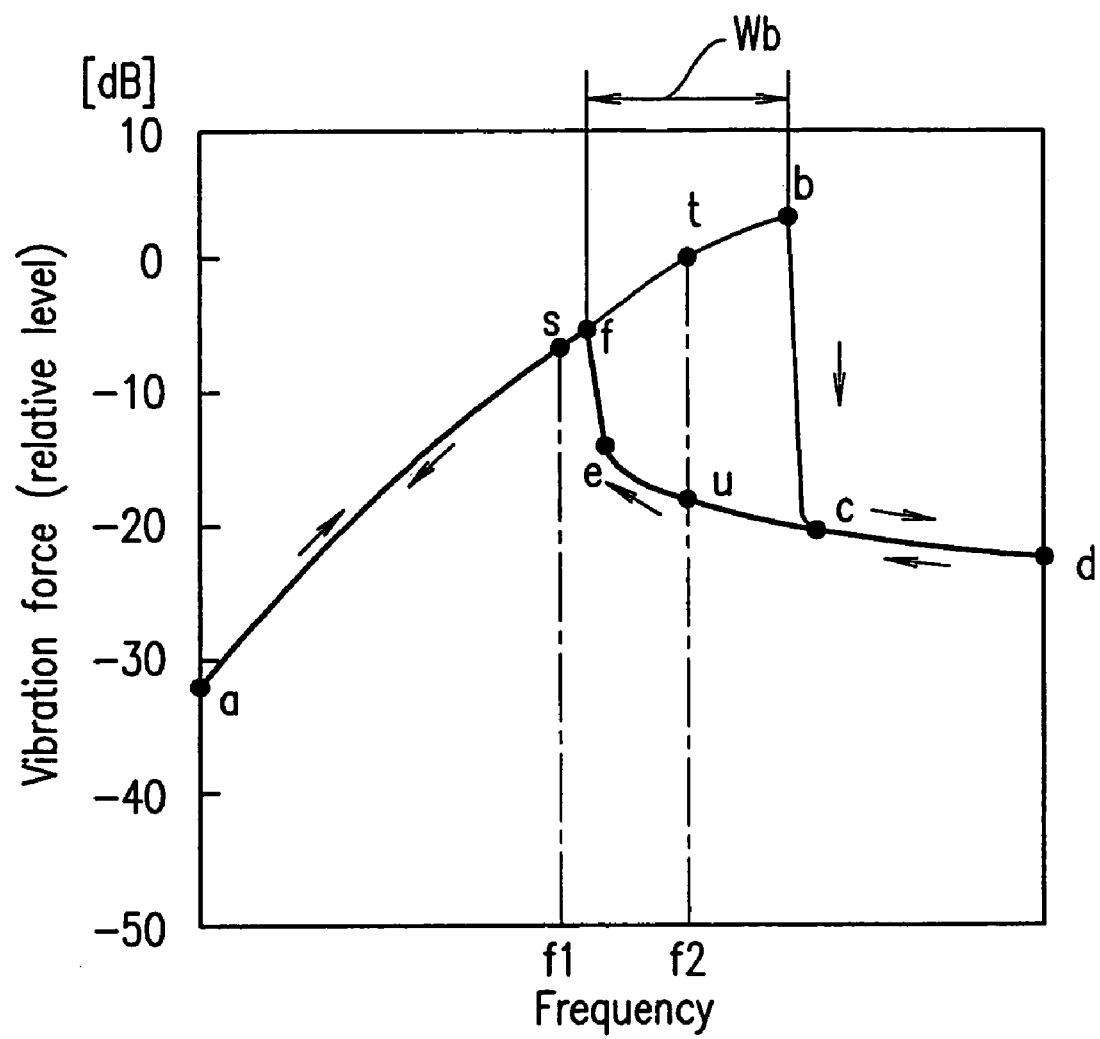

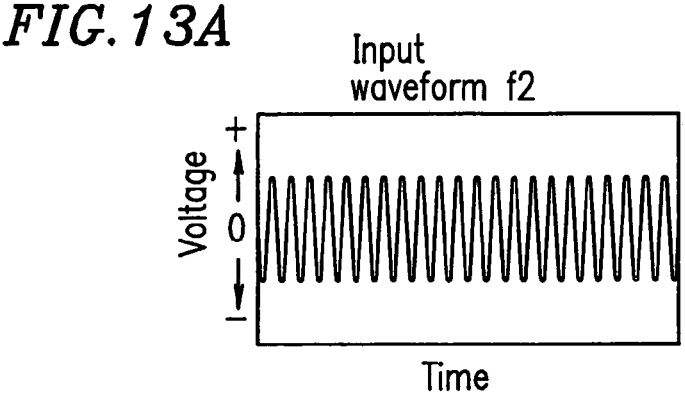
FIG. 13A Input waveform f2
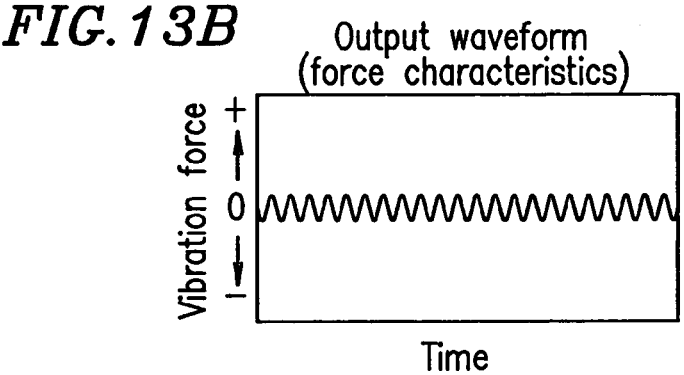
FIG. 13B Output waveform (force characteristics)
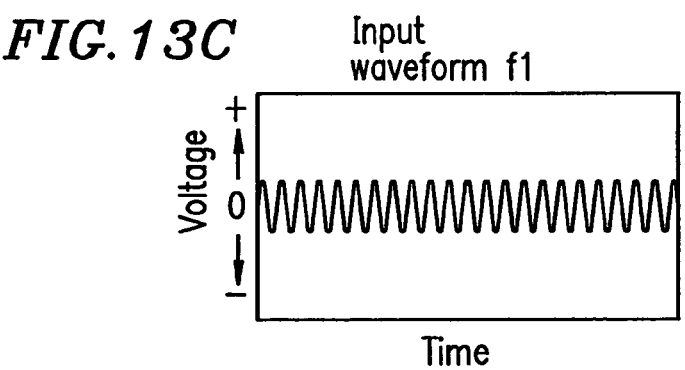
FIG. 13C Input waveform f1
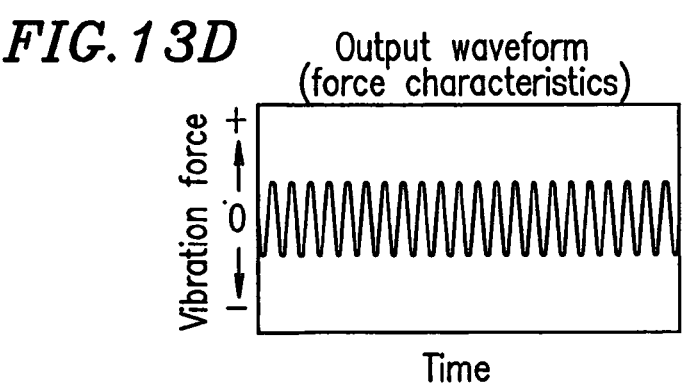
FIG. 13D Output waveform (force characteristics)

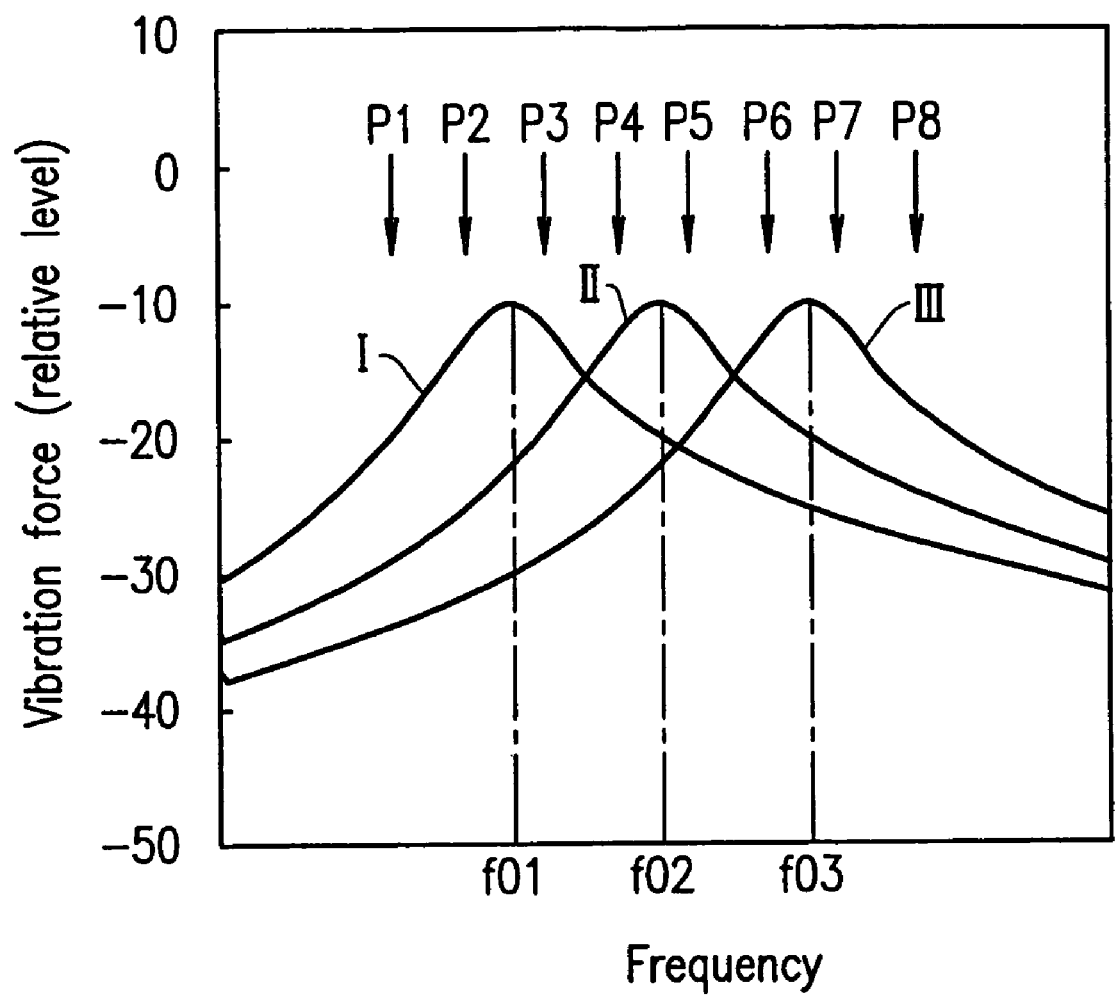

DRIVING CIRCUIT, ELECTRO-MECHANICAL-ACOUSTIC TRANSDUCER, AND PORTABLE TERMINAL APPARATUS

BACKGROUND OF THE INVENTION

1. Field of the Invention

The present invention relates to an electro-mechanical-acoustic transducer for generating a ringing tone or a ringing vibration for a portable terminal apparatus such as a portable telephone, a pager or a PHS (personal handy phone set), and a method for driving the same.

2. Description of the Related Art

Conventionally, a portable terminal apparatus such as a portable telephone, a pager or a PHS includes a plurality of vibrators which are connected to an electric signal generator so as to selectively generate a bell tone or a vibration for alerting the user of an incoming call.

There is a demand in the art to reduce the size and weight of a portable terminal apparatus. For example, Japanese Laid-Open Publication No. 8-275293 of Motorola, Inc., discloses a portable telephone using a single unit electro-mechanical-acoustic transducer capable of generating a tone and a vibration.

FIG. 32 illustrates a structure of such a conventional electro-mechanical-acoustic transducer 3200. Referring to FIG. 32, a movable mass 1 is supported by a planar nonlinear spring member 2. An electromagnetic coil 4 is enclosed in a coil form 3. A permanent magnet 5 is fixed to the periphery of the movable mass 1 opposite to the electromagnetic coil 4. Although not shown in FIG. 32, the periphery of the coil form 3 is attached to a soundboard (e.g., a casing of a portable telephone).

In the electro-mechanical-acoustic transducer 3200, an alternating magnetic field is generated in response to a drive signal applied to the electromagnetic coil 4, thereby producing an alternating excitation force between the electromagnetic coil 4 and the permanent magnet 5 thus vibrating the movable mass 1. This vibration is transmitted to the soundboard, thereby providing a vibratory alert signal when the portable telephone receives an incoming call. The transducer 3200 also generates an audible signal based on a similar principle. In order to obtain a large vibration force, a planar nonlinear spring member is employed as the member 2 for supporting the movable mass 1. FIG. 33 is a graph illustrating the relationship between the displacement and the frequency of a planar nonlinear spring member. It is known in the art that a nonlinear spring member exhibits a vibration characteristic called a "jumping phenomenon" (see, for example, YOSHIHISA "Speaker," Rikokenkyusha (March 1973). This is a phenomenon in which the displacement of the nonlinear spring member changes from A→B→C→D when the frequency is increased, and from D→C→E→F→A when the frequency is decreased.

In the F–B frequency range, the displacement characteristics are influenced by the direction of the applied frequency signal (i.e., whether it is increased or decreased). Thus, a stable vibration cannot be obtained. In view of this, the conventional electro-mechanical-acoustic transducer 3200 uses a drive signal which sweeps in the A–F frequency range, where the displacement characteristics are not influenced by the direction of the frequency signal. Where the A–F frequency range is employed, the vibration force is large at frequency F and very small at frequency A. Therefore, the vibration output obtained while the frequency signal sweeps across the A–F frequency range may not be efficient. Particularly, for a mobile information terminal apparatus such as a portable telephone, whose driving source is a battery, a strong desire exists to maximize the efficiency of a transducer and thereby reduce the power consumption thereof, so as to allow the apparatus to be used for a long period of time.

SUMMARY OF THE INVENTION

According to one aspect of this invention, there is provided a driving circuit for driving a vibrator having a mechanical vibration system which resonates at a resonance frequency. The driving circuit outputs to the vibrator at least two signals of different frequencies which are included in a frequency range including the resonance frequency. The vibrator has a function of converting an electric signal into at least one of a sound and a vibration.

In one embodiment of the invention, the at least two signals include a first signal having a frequency which is lower than the resonance frequency and a second signal having a frequency which is higher than the resonance frequency.

In one embodiment of the invention, the at least two signals include a first signal and a second signal. The driving circuit outputs to the vibrator a synthesized signal obtained by adding together the first signal and the second signal.

In one embodiment of the invention, the at least two signals include a first signal and a second signal. The driving circuit outputs to the vibrator a synthesized signal obtained by adding together the first signal and the second signal while shifting a phase of the first signal and a phase of the second signal from each other.

In one embodiment of the invention, the at least two signals include a first signal and a second signal. At least one of the first signal and the second signal includes a sine wave signal.

In one embodiment of the invention, the at least two signals include a first signal and a second signal. At least one of the first signal and the second signal includes a rectangular wave signal.

In one embodiment of the invention, the driving circuit further includes a limiter for limiting a peak output voltage of the synthesized signal.

In one embodiment of the invention, the synthesized signal is a sine wave signal which is obtained by synthesizing together a plurality of groups of frequency signals, each group including a first pair of adjacent frequency signals and a second pair of adjacent frequency signals, the first pair of adjacent frequency signals being synthesized together in reverse phase, and the second pair of adjacent frequency signals being synthesized together in phase.

In one embodiment of the invention, the vibrator includes a magnetic circuit section and at least one suspension.

In one embodiment of the invention, the suspension includes a linear suspension.

In one embodiment of the invention, the driving circuit is an electric signal generator for generating a frequency signal for a vibration or an electric-acoustic signal for a sound.

According to another aspect of this invention, there is provided a driving circuit for driving a vibrator having a mechanical vibration system having predetermined vibration force vs frequency characteristics. The mechanical vibration system has different vibration force vs frequency characteristics for an increasing frequency sweep and for a decreasing frequency sweep within a predetermined frequency range. The predetermined frequency range is defined between a lower limit frequency which represents a lowest frequency in the predetermined frequency range and an upper limit frequency which represents a highest frequency in the predetermined frequency range. The driving circuit outputs to the vibrator a first signal having a frequency within the frequency range and a second signal having a frequency which is lower than the lower limit frequency. The second signal is output to the vibrator concurrently with or prior to the first signal. The vibrator has a function of converting an electric signal into at least one of a sound and a vibration.

In one embodiment of the invention, the vibrator includes a magnetic circuit and at least one suspension.

In one embodiment of the invention, the suspension includes a nonlinear suspension.

In one embodiment of the invention, the suspension has stiffness S such that when the stiffness S is expressed by a multidimensional function with respect to a displacement X, an $X^2$ term of the multidimensional function has a non-zero value.

In one embodiment of the invention, the driving circuit is an electric signal generator for generating a frequency signal for a vibration or an electric-acoustic signal for a sound.

In one embodiment of the invention, the second signal includes a swept frequency signal whose frequency continuously varies over time.

In one embodiment of the invention, the second signal includes a plurality of point frequency signals.

In one embodiment of the invention, at least one of the first signal and the second signal includes an increasing signal whose frequency increases over time.

In one embodiment of the invention, the first signal includes a swept frequency signal whose frequency continuously varies over time. The first signal has a first turning frequency at which the frequency of the first signal stops increasing and starts decreasing and a second turning frequency at which the frequency of the first signal stops decreasing and starts increasing. The first turning frequency is lower than the upper limit frequency. The second turning frequency is higher than the lower limit frequency.

In one embodiment of the invention, the first signal includes at least one point frequency signal.

In one embodiment of the invention, the driving circuit outputs to the vibrator a synthesized signal obtained by adding together the first signal and the second signal.

In one embodiment of the invention, the driving circuit outputs to the vibrator a synthesized signal obtained by adding together the first signal and the second signal while shifting a phase of the first signal and a phase of the second signal from each other.

In one embodiment of the invention, at least one of the first signal and the second signal includes a sine wave signal.

In one embodiment of the invention, at least one of the first signal and the second signal includes a rectangular wave signal.

In one embodiment of the invention, the driving circuit further includes a limiter for limiting a peak output voltage of the synthesized signal.

In one embodiment of the invention, the synthesized signal is a sine wave signal which is obtained by synthesizing together a plurality of groups of frequency signals, each group including a first pair of adjacent frequency signals and a second pair of adjacent frequency signals, the first pair of adjacent frequency signals being synthesized together in reverse phase, and the second pair of adjacent frequency signals being synthesized together in phase.

According to still another aspect of this invention, there is provided an electro-mechanical-acoustic transducer, including: a vibrator having a mechanical vibration system which resonates at a resonance frequency; and a driving circuit for driving the vibrator. The driving circuit outputs to the vibrator at least two signals of different frequencies which are included in a frequency range including the resonance frequency.

In one embodiment of the invention, the at least two signals include a first signal having a frequency which is lower than the resonance frequency and a second signal having a frequency which is higher than the resonance frequency.

In one embodiment of the invention, the at least two signals include a first signal having a frequency which is lower than the resonance frequency and a second signal having a frequency which is higher than the resonance frequency. The driving circuit outputs to the vibrator a synthesized signal obtained by adding together the first signal and the second signal. The driving circuit selectively changes the synthesized signal by changing at least one of a frequency of the first signal, a frequency of the second signal, a frequency interval between the frequency of the first signal and the frequency of the second signal, a phase of the first signal, a phase of the second signal, a voltage level of the first signal, and a voltage level of the second signal.

According to still another aspect of this invention, there is provided an electro-mechanical-acoustic transducer, including: a vibrator having a mechanical vibration system having predetermined vibration force vs frequency characteristics; and a driving circuit for driving the vibrator. The mechanical vibration system has different vibration force vs frequency characteristics for an increasing frequency sweep and for a decreasing frequency sweep within a predetermined frequency range. The predetermined frequency range is defined between a lower limit frequency which represents a lowest frequency in the predetermined frequency range and an upper limit frequency which represents a highest frequency in the predetermined frequency range. The driving circuit outputs to the vibrator a first signal having a frequency within the frequency range and a second signal having a frequency which is lower than the lower limit frequency. The second signal is output to the vibrator concurrently with or prior to the first signal.

In one embodiment of the invention, the driving circuit outputs to the vibrator a synthesized signal obtained by adding together the first signal and the second signal. The driving circuit selectively changes the synthesized signal by changing at least one of a frequency of the first signal, a frequency of the second signal, a frequency interval between the frequency of the first signal and the frequency of the second signal, a phase of the first signal, a phase of the second signal, a voltage level of the first signal, and a voltage level of the second signal.

According to still another aspect of this invention, there is provided a portable terminal apparatus, including: a vibrator having a mechanical vibration system which resonates at a resonance frequency; an antenna for receiving an incoming call signal; a reception signal processing section for processing the incoming call signal so as to output an electric signal to the vibrator; and a driving circuit for driving the vibrator. The driving circuit outputs to the vibrator at least two signals of different frequencies which are included in a frequency range including the resonance frequency.

In one embodiment of the invention, the at least two signals include a first signal having a frequency which is lower than the resonance frequency and a second signal having a frequency which is higher than the resonance frequency.

In one embodiment of the invention, the portable terminal apparatus further includes a switching section for connecting the vibrator to one of the driving circuit and the reception signal processing section based on an output from the reception signal processing section.

In one embodiment of the invention, the portable terminal apparatus further includes a signal synthesis section for synthesizing together the electric signal output from the reception signal processing section and the output from the driving circuit.

In one embodiment of the invention, the portable terminal apparatus further includes: a first switch provided between the reception signal processing section and the signal synthesis section; a second switch provided between the driving circuit and the signal synthesis section; and a third switch provided between the signal synthesis section and the vibrator.

In one embodiment of the invention, the first switch, the second switch and the third switch operate based on a signal which is output from the reception signal processing section.

In one embodiment of the invention, the at least two signals include a first signal having a frequency which is lower than the resonance frequency and a second signal having a frequency which is higher than the resonance frequency. The driving circuit outputs to the vibrator a synthesized signal obtained by adding together the first signal and the second signal. The driving circuit selectively changes the synthesized signal by changing at least one of a frequency of the first signal, a frequency of the second signal, a frequency interval between the frequency of the first signal and the frequency of the second signal, a phase of the first signal, a phase of the second signal, a voltage level of the first signal, and a voltage level of the second signal.

According to still another aspect of this invention, there is provided a portable terminal apparatus, including: a vibrator having a mechanical vibration system having predetermined vibration force vs frequency characteristics; an antenna for receiving an incoming call signal; a reception signal processing section for processing the incoming call signal so as to output an electric signal to the vibrator; and a driving circuit for driving the vibrator. The mechanical vibration system has different vibration force vs frequency characteristics for an increasing frequency sweep and for a decreasing frequency sweep within a predetermined frequency range. The predetermined frequency range is defined between a lower limit frequency which represents a lowest frequency in the predetermined frequency range and an upper limit frequency which represents a highest frequency in the predetermined frequency range. The driving circuit outputs to the vibrator a first signal having a frequency within the frequency range and a second signal having a frequency which is lower than the lower limit frequency. The second signal is output to the vibrator concurrently with or prior to the first signal.

In one embodiment of the invention, the portable terminal apparatus further includes a switching section for connecting the vibrator to one of the driving circuit and the reception signal processing section based on an output from the reception signal processing section.

In one embodiment of the invention, the portable terminal apparatus further includes a signal synthesis section for synthesizing together the electric signal output from the reception signal processing section and the output from the driving circuit.

In one embodiment of the invention, the portable terminal apparatus further includes: a first switch provided between the reception signal processing section and the signal synthesis section; a second switch provided between the driving circuit and the signal synthesis section; and a third switch provided between the signal synthesis section and the vibrator.

In one embodiment of the invention, the driving circuit outputs to the vibrator a synthesized signal obtained by adding together the first signal and the second signal. The driving circuit selectively changes the synthesized signal by changing at least one of a frequency of the first signal, a frequency of the second signal, a frequency interval between the frequency of the first signal and the frequency of the second signal, a phase of the first signal, a phase of the second signal, a voltage level of the first signal, and a voltage level of the second signal.

In one embodiment of the invention, the driving circuit outputs to the vibrator a synthesized signal obtained by adding together the first signal and the second signal.

In one embodiment of the invention, the driving circuit outputs to the vibrator a synthesized signal obtained by adding together the first signal and the second signal while shifting a phase of the first signal and a phase of the second signal from each other.

In one embodiment of the invention, at least one of the first signal and the second signal includes a sine wave signal.

In one embodiment of the invention, at least one of the first signal and the second signal includes a rectangular wave signal.

Thus, the invention described herein makes possible the advantage of providing an electro-mechanical-acoustic transducer capable of providing a stable and efficient vibration output.

This and other advantages of the present invention will become apparent to those skilled in the art upon reading and understanding the following detailed description with reference to the accompanying figures.

BRIEF DESCRIPTION OF THE DRAWINGS

FIG. 2 is an exploded view illustrating an exemplary vibrator of the electro-mechanical-acoustic transducer according to Embodiment 1 of the present invention;

FIG. 12 is a graph illustrating the relationship between the vibration force and the frequency of the vibrator according to Embodiment 1 of the present invention;

FIGS. 13A to 13D illustrate the input/output characteristics obtained when a single frequency is input to the electro-mechanical-acoustic transducer according to Embodiment 1 of the present invention;

FIG. 20 is a graph illustrating the relationship between the vibration force and the frequency of an electro-mechanical-acoustic transducer using the linear suspension according to Embodiment 2 of the present invention;

DESCRIPTION OF THE PREFERRED EMBODIMENTS

Various embodiments of the present invention will now be described with reference to the accompanying drawings.

Embodiment 1

Figure 1:
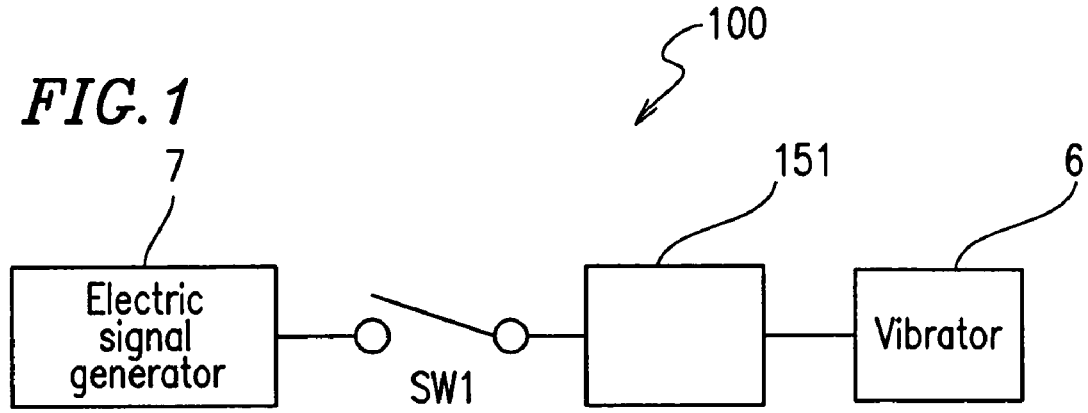
FIG. 1 is a block diagram illustrating the main part of an electro-mechanical-acoustic transducer according to Embodiment 1 of the present invention.

FIG. 1 is a block diagram illustrating an electro-mechanical-acoustic transducer 100 according to Embodiment 1 of the present invention. Referring to FIG. 1, the electro-mechanical-acoustic transducer 100 includes a vibrator 6, an electric signal generator 7 and a switch SW1 for turning ON/OFF the electric signal generated.

Figure 3A:
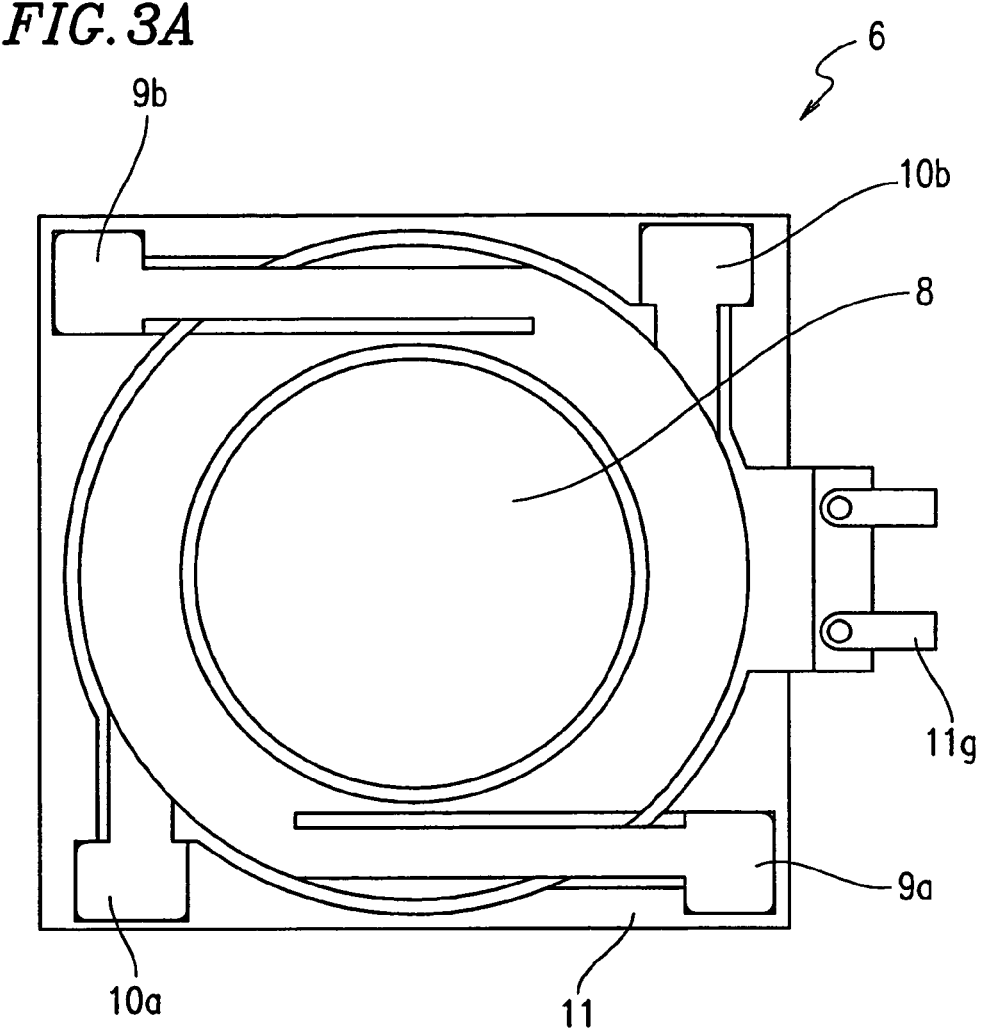
FIG. 3A is a top view illustrating the vibrator according to Embodiment 1 of the present invention with a baffle being removed.
Figure 3B:
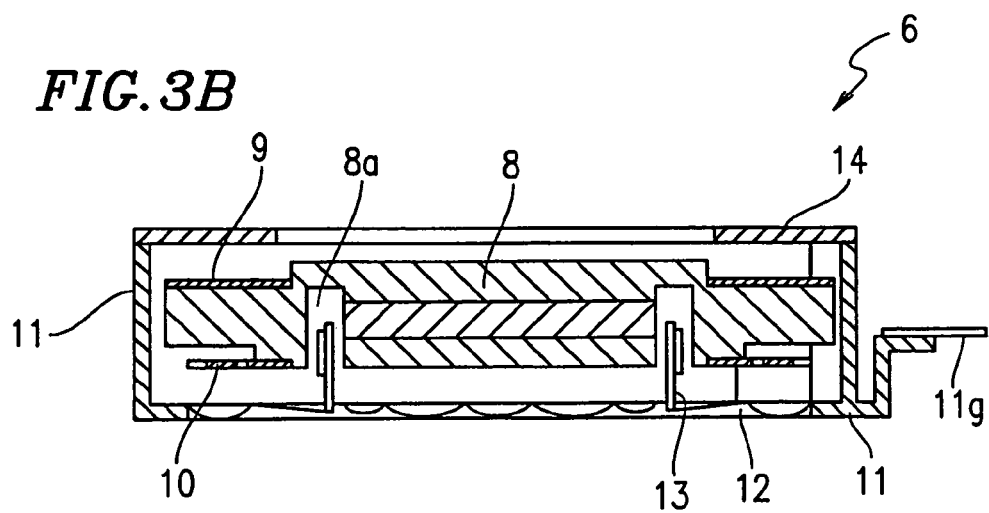
FIG. 3B is a cross-sectional view illustrating the vibrator according to Embodiment 1 of the present invention.

FIGS. 2, 3A and 3B illustrate an example structure of the vibrator 6 used in the electro-mechanical-acoustic transducer 100 of the present invention. FIG. 2 is an exploded view, FIG. 3A is a plan view with the baffle being removed, and FIG. 3B is a cross-sectional view.

Referring to FIGS. 2, 3A and 3B, the vibrator 6 includes a magnetic circuit section 8 having a yoke, a magnet and a plate which are integrally formed, and an upper suspension 9 and a lower suspension 10 coupled to the magnetic circuit section 8. The upper suspension 9 includes a pair of extensions 9a and 9b extending along opposite edges of the upper suspension 9. The lower suspension 10 includes a pair of extensions 10a and 10b extending along opposite edges of the lower suspension 10. The extensions 9a and 9b extend in a direction different from a direction in which the extensions 10a and 10b extend. In this embodiment, the weight of the magnetic circuit section 8 is 3 g.

The vibrator 6 further includes a plastic supporting member 11 and a non-magnetic diaphragm 12 made of a titanium material or a plastic. The plastic supporting member 11 includes an upper aperture 11e, a lower aperture 11f, and receptacles 11a, 11b, 11c and 11d for receiving the extensions 9a, 9b, 10a and 10b, respectively. The periphery of the diaphragm 12 is received by a lower rim defining the lower aperture 11f of the supporting member 11. A voice coil 13 is concentrically bonded to the diaphragm 12, with the upper edge thereof being inserted into a magnetic gap 8a of the magnetic circuit section 8 as shown in FIG. 3B, which is supported between the upper and lower suspensions 9 and 10.

The vibrator 6 further includes a baffle 14 attached to an upper rim defining the upper aperture 11e of the supporting member 11. The supporting member 11 includes an external input terminal 11g which is connected to a lead wire of the voice coil 13.

Each of the upper and lower suspensions 9 and 10 is a spring made of a stainless material or a beryllium alloy material. The size and shape of the suspensions 9 and 10 are designed so that the suspensions 9 and 10 have nonlinear stiffness characteristics with respect to the amount of amplitude displacement. In the illustrated example, each of the extensions 9a, 9b, 10a and 10b has a length of 8 mm, a width of 1 mm and a thickness of 0.085 mm.

Figure 4:
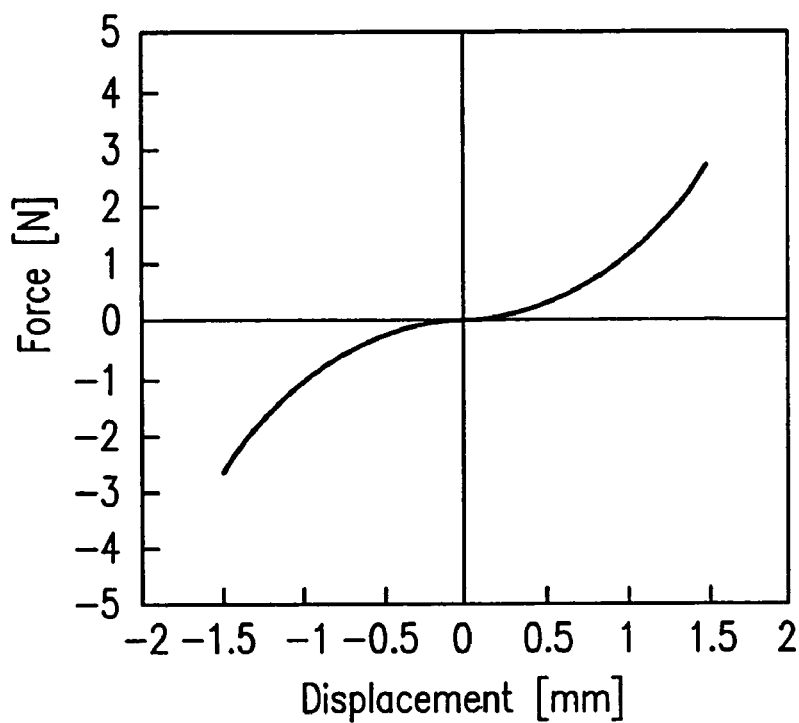
FIG. 4 is a graph illustrating the relationship between the displacement and the applied force of a suspension of a vibrator according to Embodiment 1 of the present invention.
Figure 5:
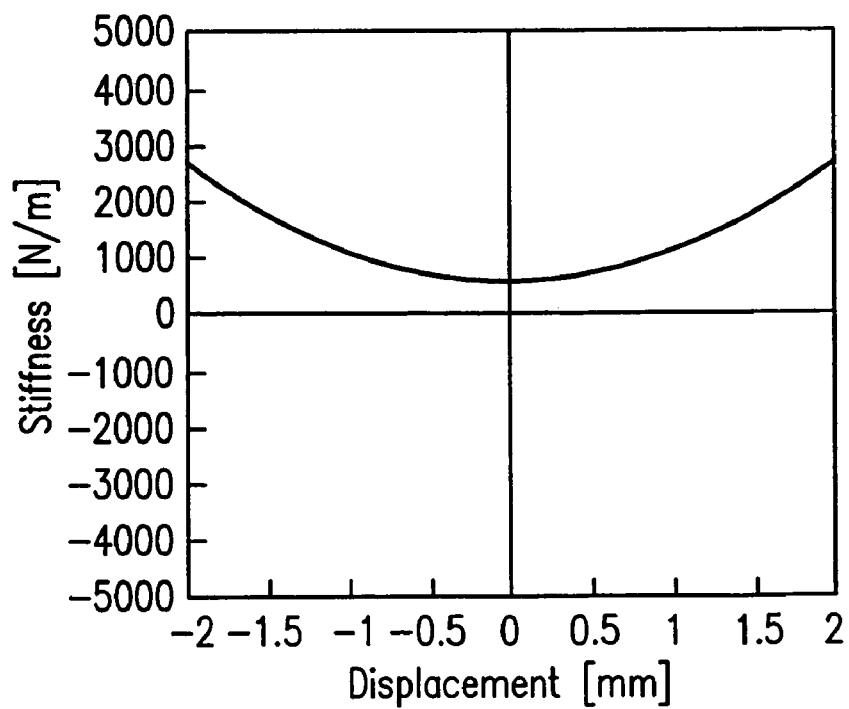
FIG. 5 is a graph illustrating the relationship between the displacement and the stiffness of the suspension.
Figure 6:
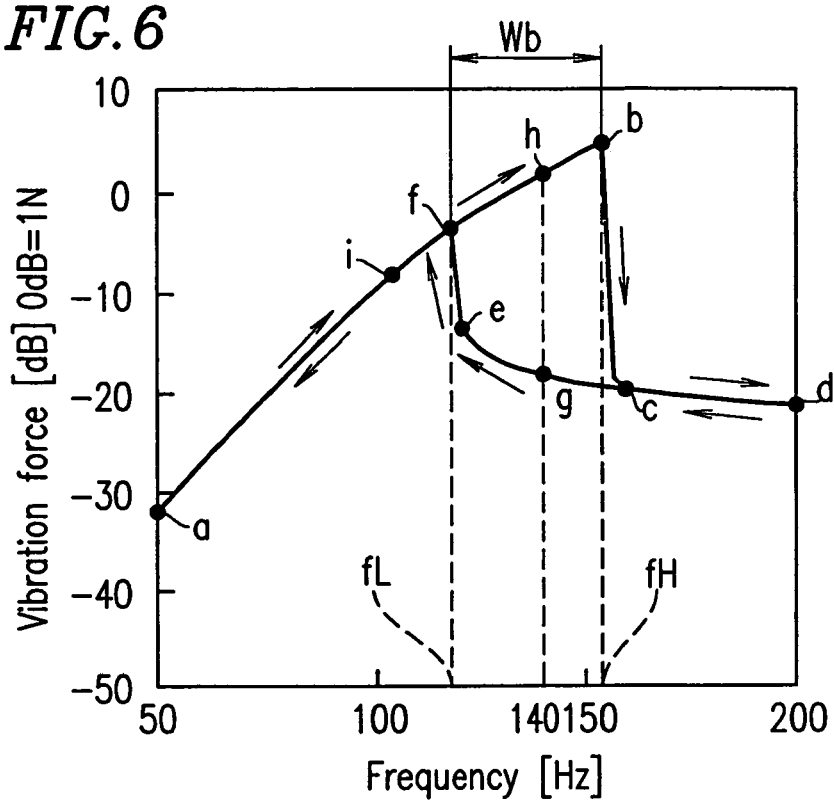
FIG. 6 is a graph illustrating the relationship between the vibration force and the frequency of a vibrator according to Embodiment 1 of the present invention.
Figure 33:
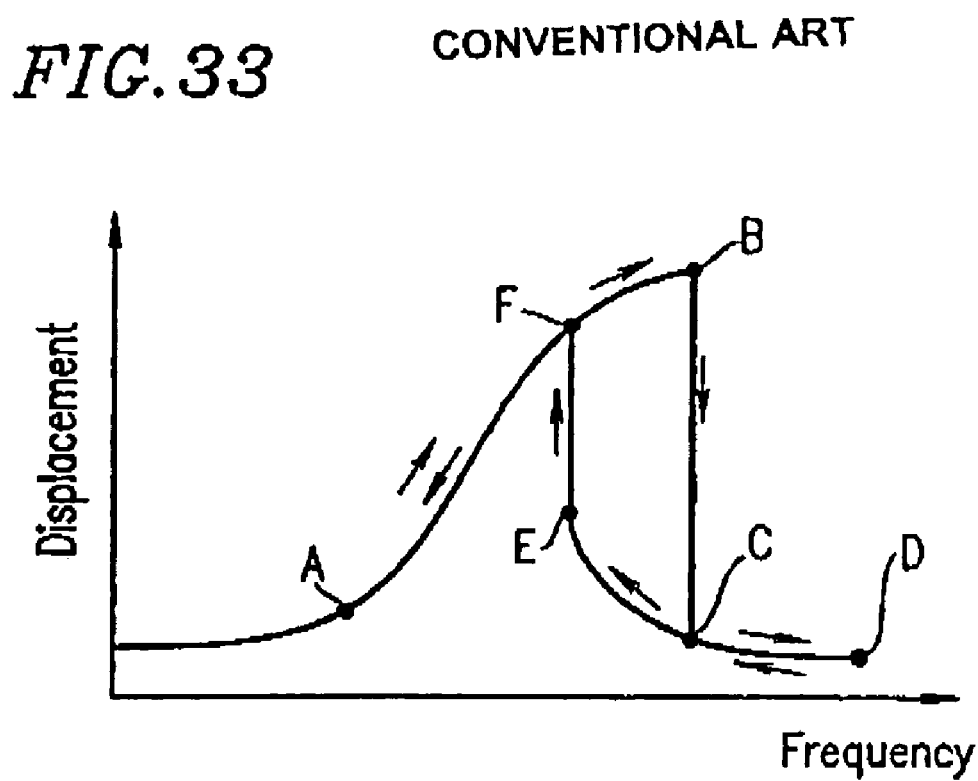
FIG. 33 is a graph illustrating the relationship between the displacement and the frequency of the conventional electro-mechanical-acoustic transducer.

FIG. 4 is a graph illustrating the relationship between the displacement and the applied force of the upper and lower suspensions 9 and 10. This graph shows the force vs displacement characteristics which are obtained when a force is applied upon the magnetic circuit section 8 with the extensions 9a, 9b, 10a and 10b of the upper and lower suspensions 9 and 10 being fixed to each other and the magnetic circuit section 8 being concentrically interposed therebetween. The horizontal axis of the graph represents the displacement and the vertical axis thereof represents the applied force. FIG. 5 is a graph illustrating the stiffness characteristics of the suspensions 9 and 10 obtained from the graph shown in FIG. 4, where the horizontal axis represents the displacement and the vertical axis represents the stiffness. Each of the suspensions 9 and 10 exhibits nonlinear characteristics in which the stiffness value increases as the displacement increases. FIG. 6 is a graph illustrating the vibration force characteristics of the vibrator 6 including such nonlinear suspensions 9 and 10 with respect to an input frequency signal (the mass of the magnetic circuit section 8 is about 3 g). FIG. 6 illustrates the vibration force vs frequency characteristics obtained when the frequency is increased and decreased. When the frequency is continuously increased, the vibration force changes from a→b→c→d. When the frequency is continuously decreased, the vibration force changes from d→c→e→f→a. This is substantially the same jumping phenomenon of a nonlinear suspension as described above in the prior art section with reference to FIG. 33.

The operation of the electro-mechanical-acoustic transducer 100 including such a vibrator 6 will now be described.

Frequency signals generated by the electric signal generator 7 are input to the vibrator 6 when the switch SW1 is turned ON. At least one of the input frequency signals include a frequency in a frequency range Wb which is defined between a lower limit frequency (fL) and a higher limit frequency (fH). The lower limit frequency fL and the higher limit frequency fH respectively correspond to point f and point b in the graph of FIG. 6 illustrating the vibration force characteristics of the nonlinear suspensions 9 and 10. The frequency range Wb is a frequency range in which the suspensions 9 and 10 exhibit different vibration force characteristics when the frequency is increasing and when the frequency is decreasing. It appears that the vibration force generated by the vibrator 6 is maximized in the frequency range Wb. However, when a signal having a frequency of 140 Hz, within the frequency range Wb, was solely applied to the vibrator 6, the vibration force corresponding to point g (which corresponds to 140 Hz) along the lower characteristic line for a decreasing frequency sweep was obtained, and the intended vibration force corresponding to point h (which also corresponds to 140 Hz) along the upper characteristic line for an increasing frequency sweep was not obtained. When the frequency is decreased from the higher limit frequency fH corresponding to point b to the lower limit frequency fL corresponding to point f, the vibration force characteristic line between point f and point b for an increasing frequency sweep is not reproduced. In order to stably ensure the characteristic line from point f to point b along which a large vibration force is obtained, at least one frequency which is lower than the lower limit frequency fL of the frequency range Wb should be included in the input signals to the vibrator 6.

Figure 7:
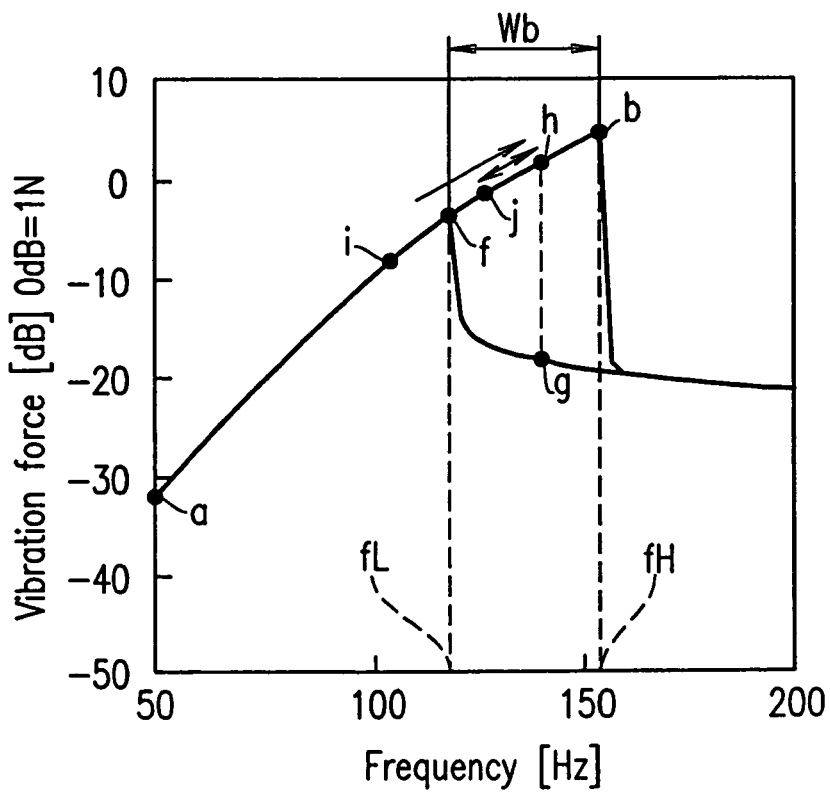
FIG. 7 is another graph illustrating the relationship between the vibration force and the frequency of the vibrator.

Referring to FIG. 7, it is more preferred that the frequency of the swept frequency signal increases from point i, which is lower than fL, to point h, which is within the frequency range Wb, decreases from point h to point j, which is also within the frequency range Wb, and is thereafter repeatedly swept between point h and point j (i.e., initially i→h, and thereafter h→j→h→j→h→ . . . ). In such a case, the frequency of the input signal is swept within the frequency range Wb, in which a large vibration force is obtained, thereby ensuring a larger vibration force.

In the above-described examples, the frequency of the input signal is initially swept from point i to point h and is thereafter repeatedly decreased and increased. Alternatively, the frequency of the input signal may be increased from point i and then stopped at point h, thereafter continuously applying the input signal whose frequency is fixed at point h. In such a case, the vibration force does not jump to point g along the lower characteristic line for a decreasing frequency sweep, as in the case where the frequency corresponding to point h or g is solely input, thereby maintaining a large vibration force. Therefore, it is possible to obtain a large vibration force continuously by setting point h in the vicinity of the higher limit frequency fH of the frequency range Wb.

Figure 8:
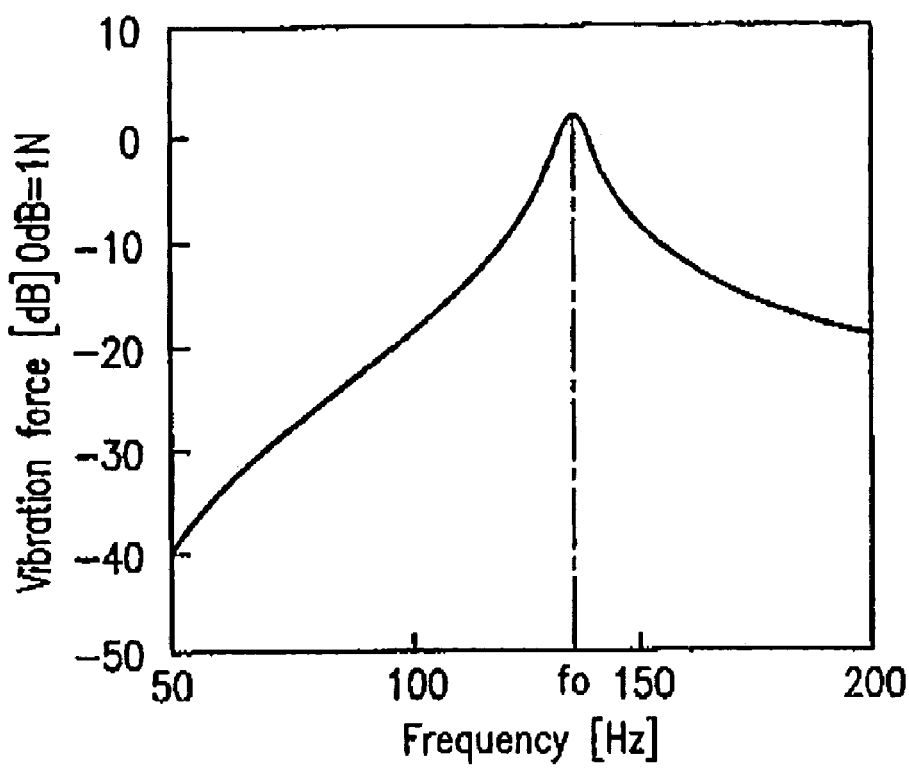
FIG. 8 is a graph illustrating the relationship between the vibration force and the frequency of a conventional vibrator using a linear suspension.

The stiffness characteristics of each suspension of the vibrator 6 are particularly important. FIG. 8 illustrates the vibration force characteristics of a vibrator having a magnetic circuit section which is supported by a suspension without nonlinearity. With a linear suspension, the vibration force characteristics do not vary between an increasing frequency sweep and a decreasing frequency sweep. However, the frequency with which a large vibration force is obtained is limited to the resonant frequency $f_0$ of the mechanical system which is determined based on the stiffness of the suspension and the mass of the magnetic circuit section. With frequencies other than the resonant frequency $f_0$, the vibration force significantly decreases. Thus, in such a case, it is necessary to provide a resonant frequency detection means for matching the frequency of the drive signal with the resonant frequency $f_0$. Otherwise, it is necessary to precisely control the resonant frequency during the production process so that the resonant frequency of the vibrator is matched with a predetermined driving frequency.

With the vibration force characteristics of the nonlinear suspension as illustrated in FIG. 6, a large vibration force is obtained in a wide frequency band (f→b), but not a narrow frequency band such as $f_0$ as in the case where a linear suspension is used. In order to obtain a large vibration force in such a wide frequency band, the special nonlinear vibration force characteristics of the suspension (e.g., 9 or 10) are preferred. For example, the vibration force-characteristics illustrated in FIG. 6 can be obtained as follows. The displacement (x) vs vibration force (F) characteristics illustrated in FIG. 4 are represented by the following multidimensional function.

Expression 1

$$F=S_1 x+S_2 x^2+S_3 x^3$$

Moreover, the displacement (x) vs stiffness (S) characteristics illustrated in FIG. 5 are represented by the following expression.

Expression 2

$$S=S_1+S_2 x+S_3 x^2$$

For example, when $S_1$, $S_2$ and $S_3$ in Expression 2 above are set as follows, $S_1=503.6$
$S_2=0$
$S_3=5.5\times10^8$, and the displacement x is set to 1 mm, the values of the respective terms of Expression 2 are as shown in Table 1 below.

TABLE 1

| $S_1$[N/m] | $S_2 x$[N/m] | $S_3 x^2$[N/m] |
|---|---|---|
| 503.6 | 0 | 550 |

Thus, it can be seen that the nonlinear term ($S_3 x^2$) is the factor which causes the vibration force characteristics between an increasing frequency sweep and a decreasing frequency sweep and which allows for a large vibration force to be obtained in a wide frequency band.

Therefore, at least one of the suspensions 9 or 10 of the vibrator 6 used in the supporting member 11 is preferably configured such that the $x^2$ term has a non-zero value.

Figure 9:
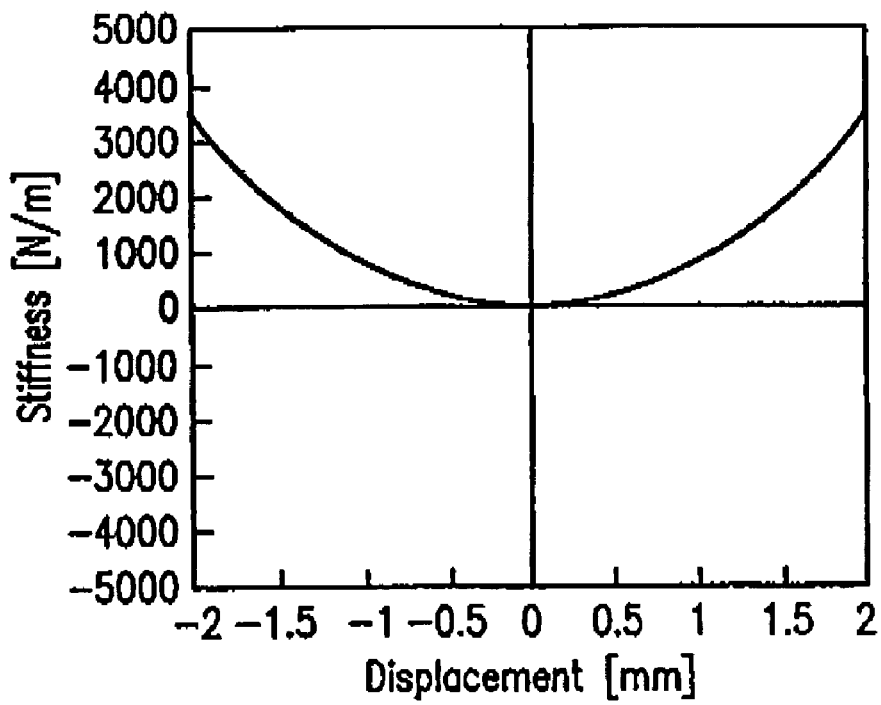
FIG. 9 is a graph illustrating the relationship between the displacement and the stiffness of a second nonlinear suspension according to Embodiment 1 of the present invention.
Figure 10:
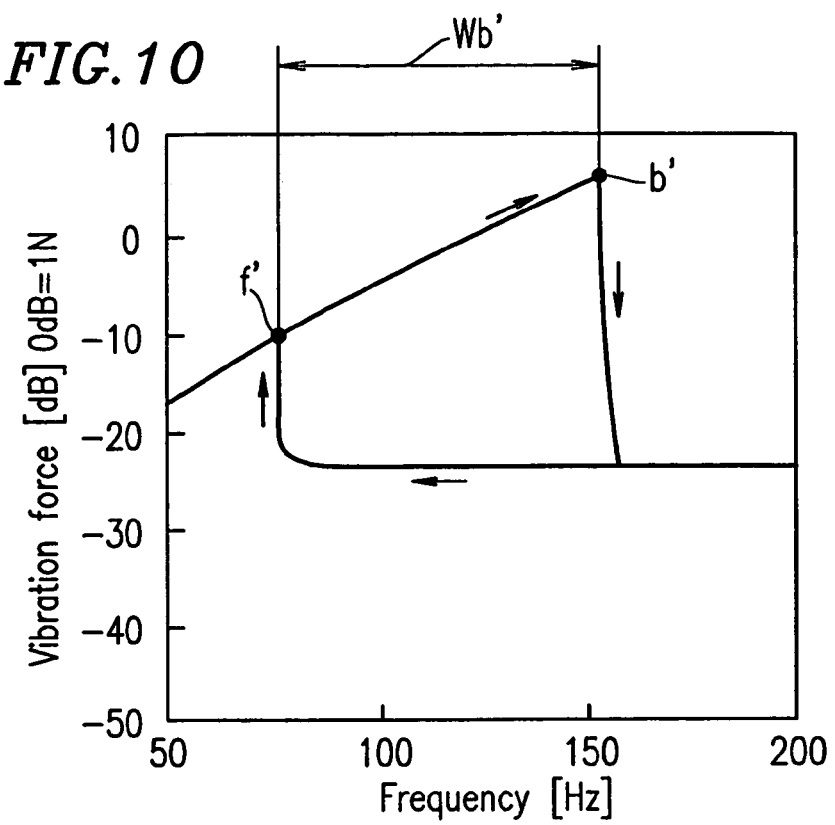
FIG. 10 is a graph illustrating the relationship between the vibration force and the frequency of the vibrator according to Embodiment 1 of the present invention.

When $S_1$, $S_2$ and $S_3$ are set as follows, $S_1=0$
$S_2=0$
$S_3=8.0\times10^8$, so that the $S_1$ term and the $S_2$ term of the stiffness function of Expression 2 above are smaller than the $S_3$ term, whereby only the $S_3$ term substantially has a value, the obtained displacement vs stiffness characteristics are as illustrated in FIG. 9, and the obtained vibration force characteristics provided by the vibrator 6 are as illustrated in FIG. 10. As can be seen in FIG. 10, the frequency range f–b' in which the vibration force characteristics vary between an increasing frequency sweep and a decreasing frequency sweep is wider than that illustrated in FIGS. 6 and 7, and the gradient of the vibration force characteristic line for an increasing frequency sweep is less than that illustrated in FIGS. 6 and 7. Thus, the amount of change in the vibration force with respect to a change in the frequency of the input signal is reduced, whereby it is possible to obtain a large vibration force more stably.

In the above-described two examples, it is assumed that the $S_2$ term is 0. However, also when the $S_2$ term is not 0, the jumping phenomenon in which the vibration force characteristics vary between an increasing frequency sweep and a decreasing frequency sweep occurs in substantially the same manner. This also applies to cases where the expression has a term of an even higher order.

A nonlinear suspension in which the $x^2$ term has a non-zero value can be realized by stiffness characteristics in which the amplitude is limited as the displacement increases. Such nonlinearity can be realized easily by, for example, reducing the length of the suspension so as to limit the amplitude of the suspension or by employing a material which has a small ductility.

Figure 11:
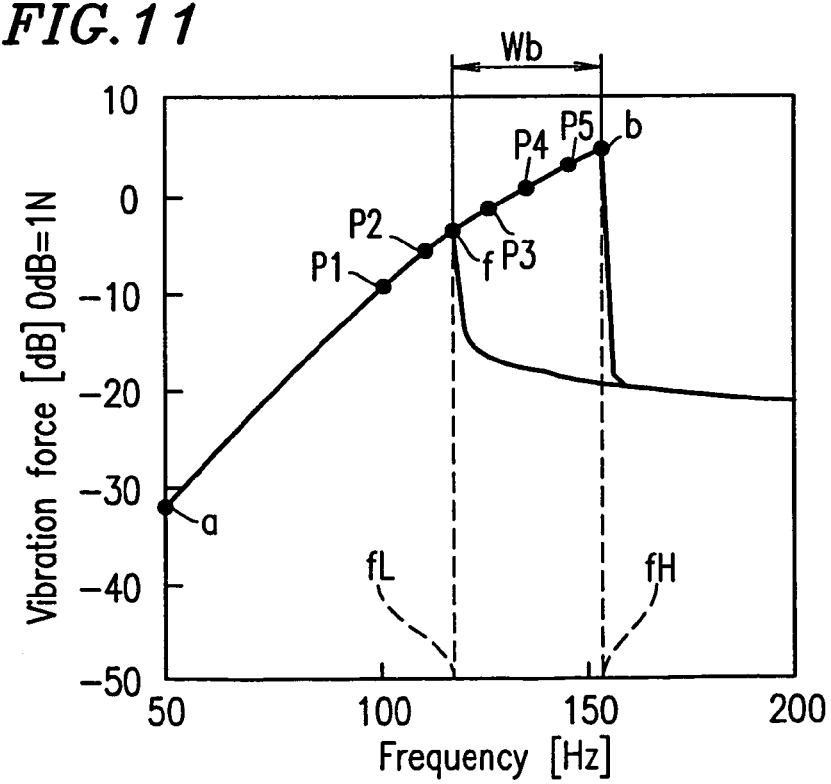
FIG. 11 is a graph illustrating the relationship between the vibration force and the frequency of the vibrator according to Embodiment 1 of the present invention, also illustrating input frequency points.

Moreover, with the electro-mechanical-acoustic transducer 100 of the present invention, the frequency signal generated by the electric signal generator 7 and supplied to the vibrator 6 is not limited to a continuously swept frequency signal. Alternatively, the frequency signal may be a series of discrete point frequencies. The series of point frequencies preferably include at least one frequency which is lower than the lower limit frequency fL of the frequency range Wb as the initial input frequency. FIG. 11 illustrates an example of such a series of point frequencies. The input frequency to the vibrator 6 starts from P1 and then changes from P2→P3→P4→P5. The frequency of the input signal may be stopped at the last frequency P5 and the fixed frequency P5 can be provided continuously thereafter. In such a case, the vibrator 6 can continuously output a large vibration force. Alternatively, the input frequency may be initially increased from P1→P2→P3→P4→P5, and then periodically increased and decreased within the frequency range Wb, e.g., P5→P4→P3→P4→P5. When the point frequency is switched from an initial frequency to a maximum frequency such frequencies are excessively spaced apart from each other, e.g., P1→P5. Thus, a stable operation may not be realized. Therefore, it is preferable to interpolate such a frequency gap between the initial frequency and the maximum frequency with one or more point frequencies such as P3 within the frequency range Wb. However, this may not be necessary when an initial frequency and a destination frequency (e.g., P2 and P3) are in the vicinity of the lower limit frequency fL, even if the initial frequency (P2) is lower than the lower limit frequency fL and the destination frequency (P3) is within the frequency range Wb.

As described above, the electro-mechanical-acoustic transducer 100 can efficiently provide a large vibration force over a wide frequency band due to the employment of the vibrator 6 which uses a nonlinear suspension.

While a waveform of the input signal is preferably a sine wave, effects similar to those described above can be expected with a rectangular wave input signal if the fundamental frequency thereof satisfies the above-described frequency conditions. In such a case, however, a higher harmonic component is likely to be applied to the voice coil 13, thereby generating an unnecessary tone when the vibrator 6 is vibrating. Therefore, it is preferable to insert a high-cut filter 151 which cuts off a higher frequency band between the electric signal generator 7 and the vibrator 6.

Where the input signal generated by the electric signal generator 7 and supplied to the vibrator 6 is a voice or music signal including a high frequency component, the diaphragm 12 can vibrate and function as a speaker, thereby allowing for an acoustic reproduction. In such a case, if the lower limit frequency of the acoustic signal is set to be higher than the lower limit frequency fL of the frequency range Wb, it is possible to produce a sound by vibrating only the diaphragm 12 without substantially vibrating the magnetic circuit section 8. This is effective where it is preferred to reproduce a vibration and a sound separately.

The frequency signal generated by the electric signal generator 7 is preferably a synthesized signal obtained by adding together a plurality of signals including at least one frequency which is lower than the frequency range Wb.

The operation of the electro-mechanical-acoustic transducer 100 including the electric signal generator 7 for generating such a frequency signal and the vibrator 6 having a nonlinear suspension will now be described.

The frequency signal from the electric signal generator 7 is input to the vibrator 6. The frequency signal is a synthesized signal obtained by adding together the frequency corresponding to point t within the frequency range Wb illustrated in FIG. 12 (in which the vibration force characteristics of the nonlinear suspensions 9 and 10 vary between an increasing frequency sweep and a decreasing frequency sweep) and the frequency corresponding to point h which is lower than the frequency range Wb.

FIGS. 13A to 13D illustrate the input waveform and the output waveform obtained when frequencies f1 and f2 (corresponding to points s and t, respectively) are individually input to the vibrator. FIG. 13A illustrates the waveform of an input signal which has a frequency of f2 and has a peak voltage amplitude which is about twice as high as that of the other input signal having a frequency of f1 shown in FIG. 13C. FIG. 13B illustrates a vibration force waveform obtained when a signal having the frequency f2 is input. FIG. 13C illustrates the input signal having the frequency f1. FIG. 13D illustrates a vibration force waveform obtained when a signal having the frequency f1 is input. The frequency signal f2 corresponding to point g is a signal having a frequency within the frequency range Wb. As described above with reference to FIG. 12, a large vibration output is obtained from the vibrator 6 by an increasing frequency sweep. However, when frequency signal f2 is applied solely, the vibration force is reduced to the value of point u along the characteristic line for a decreasing frequency sweep. The frequency f1 corresponding to point s is a frequency lower than the frequency range Wb. With the frequency f1, the vibration force characteristics do not vary between an increasing frequency sweep and a decreasing frequency sweep. Therefore, even though the input frequency signal f1 has a peak voltage amplitude which is ½ of the peak voltage amplitude of the input frequency signal f2, the obtained output waveform (vibration force waveform) has a greater amplitude than that obtained with the input frequency signal f1, as can be seen in FIGS. 13B and 13D.

Figure 14A:
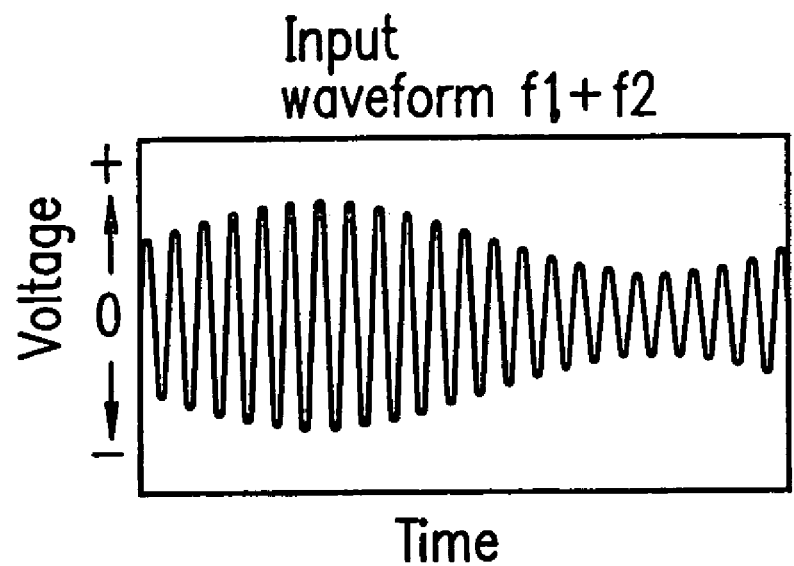
FIGS. 14A and 14B illustrate the input/output characteristics obtained when a synthesized frequency signal is input to the electro-mechanical-acoustic transducer according to Embodiment 1 of the present invention.
Figure 14B:
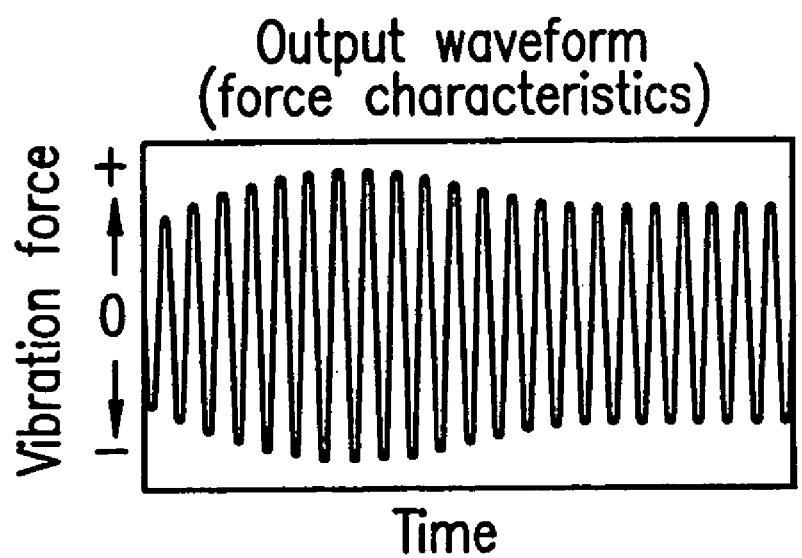

FIG. 14A illustrates the waveform of a synthesized input signal obtained by adding together the above-described two frequency signals f1 and f2. FIG. 14B illustrates the vibration force characteristics obtained when the synthesized input signal illustrated in FIG. 14A is input to the vibrator 6. The input waveform is an amplitude-modulated signal whose amplitude peak value periodically increases and decreases. The amplitude peak value of the output waveform of the vibration force characteristics also increases and decreases over time. It can be seen in FIG. 14B that the peak amplitude value of the output waveform is a larger value as compared to when a single frequency is solely used as illustrated in FIGS. 13A to 13D. Thus, it can be seen that the vibration force corresponding to point t which is obtained with the frequency f2 during an increasing frequency sweep is obtained by using a signal obtained by synthesizing two frequencies together.

Where the electric signal generator 7 generates an acoustic signal such as a melody signal, a musical signal, or a voice signal, the diaphragm 12 of the vibrator 6 to which the voice coil 13 is bonded vibrates, thereby producing the acoustic signal. In such a case, even when the low frequency component of the acoustic signal is included in the frequency range Wb, the generated vibration force is small. Therefore, the vibratory alert function and the sound alert function are substantially separated from each other. Both a vibration signal and an acoustic signal can be input so as to reproduce the vibration signal and the sound signal simultaneously. Thus, by adjusting the signal frequency band and synthesizing together a plurality of signals, the vibrator 6 can function as a multiple function transducer capable of reproducing a vibration signal and an acoustic signal.

The vibration force obtained from a frequency signal within the frequency range Wb is greater than the vibration force obtained from a frequency signal lower than the frequency range Wb. Therefore, it is preferred in order to reduce the power consumption that the input voltage level of the lower frequency signal is minimized while ensuring a stable vibration force output from a frequency signal within the frequency range Wb. While two sine wave signals are used as input frequency signals in this embodiment, three or more sine wave signals may alternatively be used to achieve similar effects. The voltage level of each input frequency signal can be determined based on a principle similar to that used in this embodiment. The input signal may alternatively be a synthesized signal obtained by adding together two rectangular wave signals if the fundamental frequency thereof satisfies the above-described frequency conditions. In such a case, however, a higher harmonic component included in the signal is likely to introduce a distortion into the signal reproduced from the diaphragm 12. Therefore, it is preferable to insert a high-cut filter which cuts off a higher frequency band in a stage preceding the vibrator 6.

Figure 15:
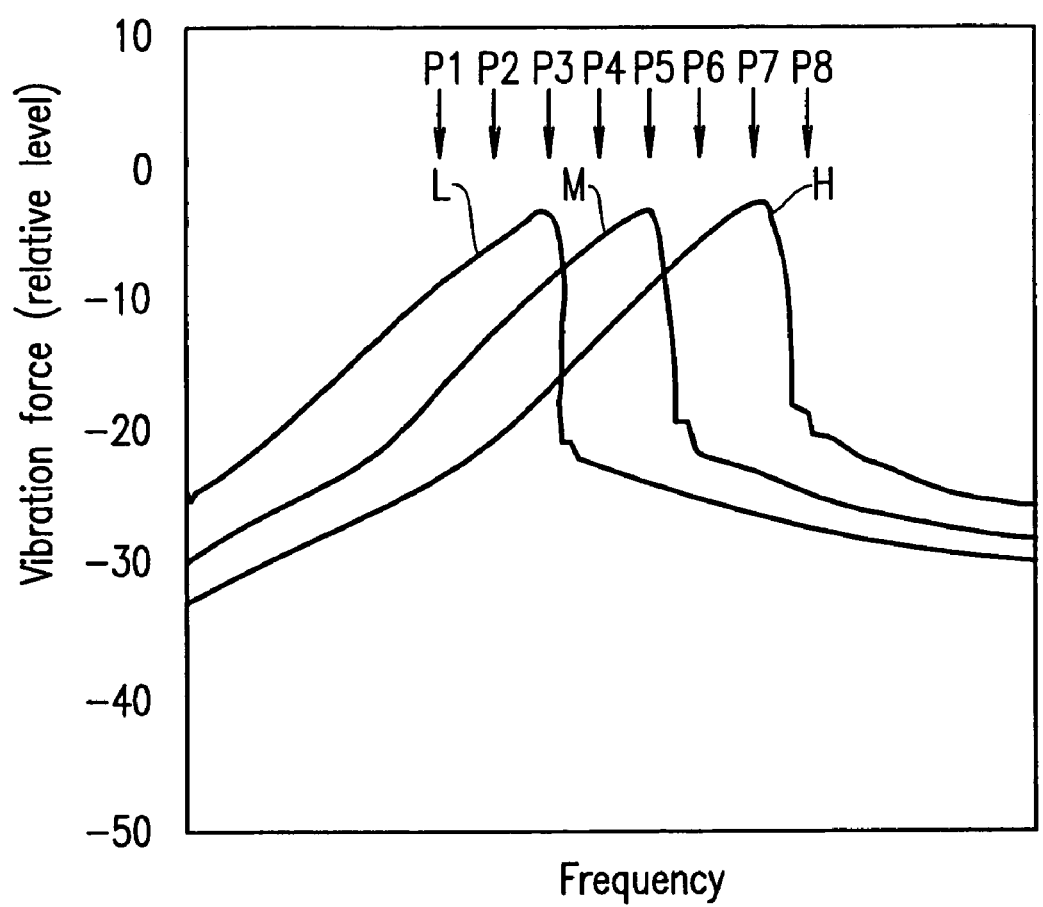
FIG. 15 is a graph illustrating variations in the vibration force vs frequency characteristics of the vibrator according to Embodiment 1 of the present invention.

FIG. 15 illustrates various vibration force vs frequency characteristics L, M and H resulting from variations in the mass production of the vibrator 6 having a nonlinear suspension. While FIG. 15 only illustrates the characteristics which are observed while continuously increasing the frequency, the jumping phenomenon (a phenomenon in which the characteristics vary between an increasing frequency sweep and a decreasing frequency sweep) will similarly be observed when the frequency is continuously decreased, as illustrated in FIGS. 6 and 12.

The frequency signal generated by the electric signal generator 7 is a synthesized signal obtained by adding together a plurality of frequency signals P1–P8 while shifting the phases of the signals with respect to one another. At least one of the frequency signals P1–P8 has a frequency which is lower than the frequency range Wb of the vibration force characteristic line L which is shifted toward the low frequency side, and at least one of the frequency signals P1–P8 has a frequency which is higher than the frequency range Wb of the vibration force characteristic line H which is shifted toward the high frequency side.

The operation of the electro-mechanical-acoustic transducer 100 including the electric signal generator 7 for generating a frequency signal as described above and the vibrator 6 having a nonlinear suspension will now be described.

The frequency signal from the electric signal generator 7 is input to the vibrator 6. The frequency signals used in this example are a series of point frequencies P1–P8. The lowest frequency is P1 which is lower than the frequency range Wb of the vibration force characteristic line L which is shifted toward the low frequency side, and the highest frequency is P8 which is higher than the frequency range Wb of the vibration force characteristic line H which is shifted toward the high frequency side. The other frequencies P2–P7 are equally spaced from one another between P1 and P8.

Figure 16A:
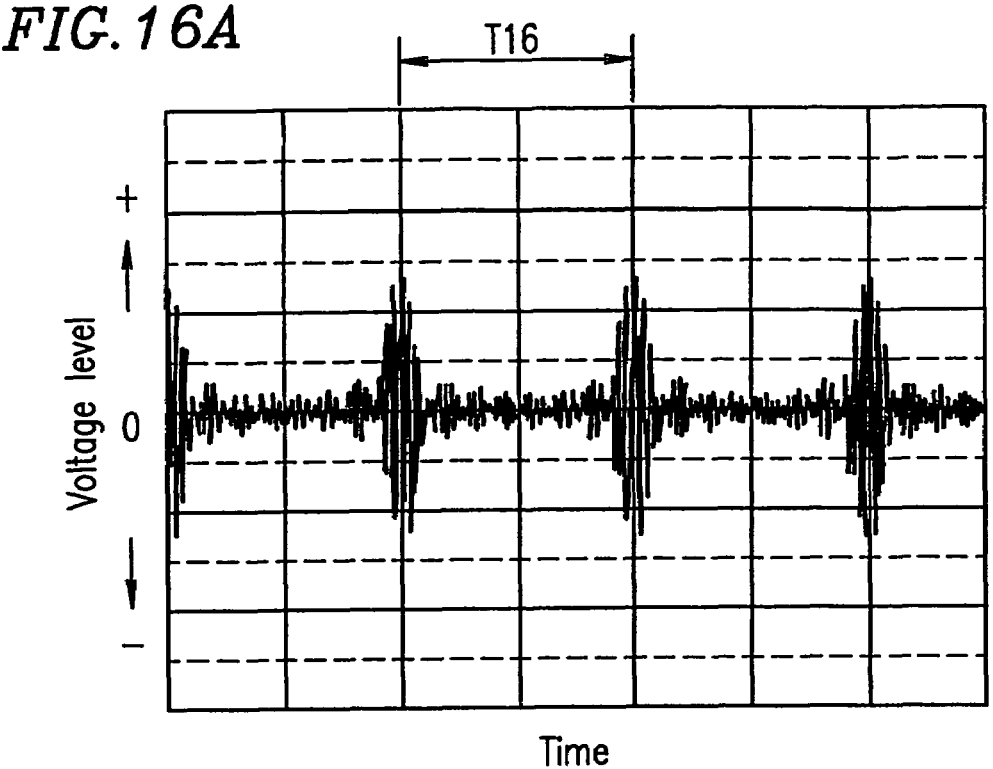
FIG. 16A illustrates a waveform of a synthesized signal obtained by adding together a plurality of frequency signals in phase.
Figure 16B:
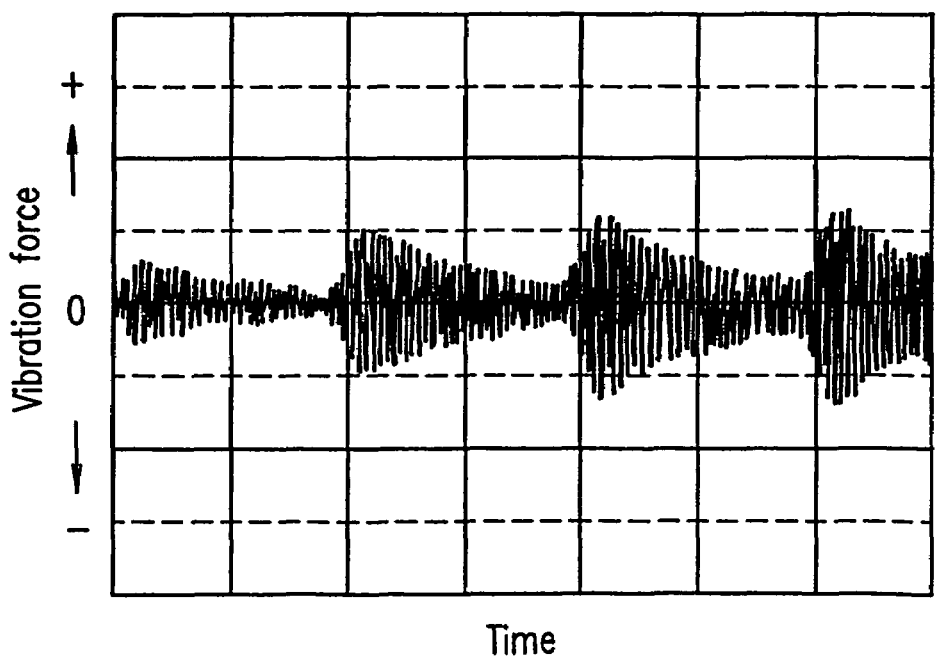
FIG. 16B illustrates a waveform of a vibration force obtained by the synthesized signal.

The effects of the present embodiment will now be described. FIG. 16A illustrates the waveform of an electric signal which is obtained by adding together eight point frequencies in phase. The electric signal is input to the vibrator 6 having the vibration vs frequency characteristics M shown in FIG. 7. FIG. 16B illustrates the waveform of the output vibration characteristics of the vibrator 6. The peak amplitude of the electric signal periodically increases with a period T16 (FIG. 16A) which is equal to the inverse number of the frequency interval between the respective frequencies (i.e., 200 mS for a 5 Hz interval). Accordingly, the output vibration waveform has a large peak amplitude at the beginning of each period, but the vibration force attenuates until the beginning of the next period.

While such a vibration waveform produces a periodically increasing vibration force, a more preferred vibration waveform is one with which a large vibration force is maintained over time.

Figure 17A:
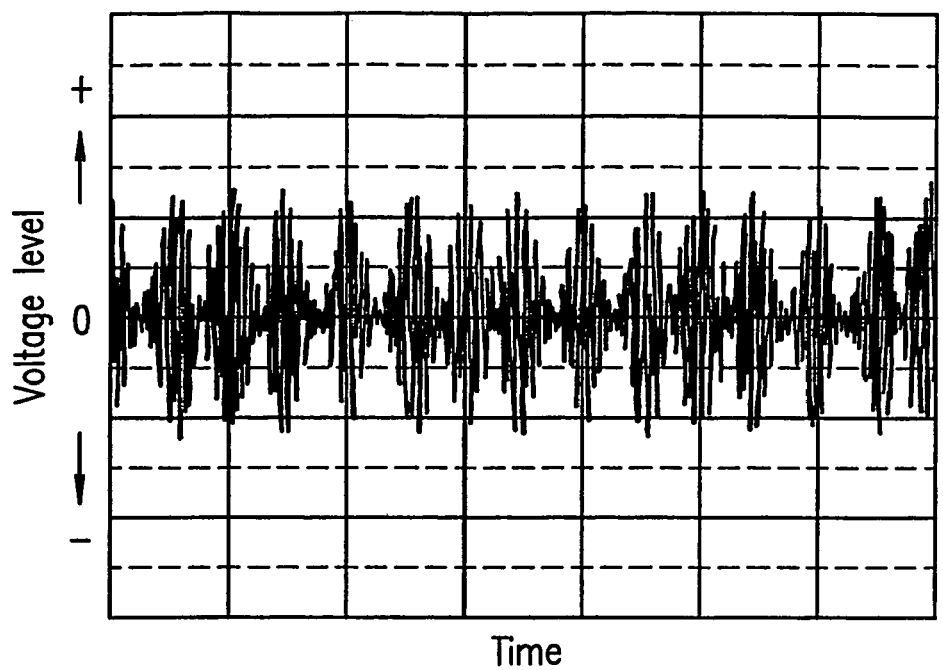
FIG. 17A illustrates a waveform of a synthesized signal obtained by adding together a plurality of frequency signals while adjusting the phase thereof by the electro-mechanical-acoustic transducer according to Embodiment 1 of the present invention.
Figure 17B:
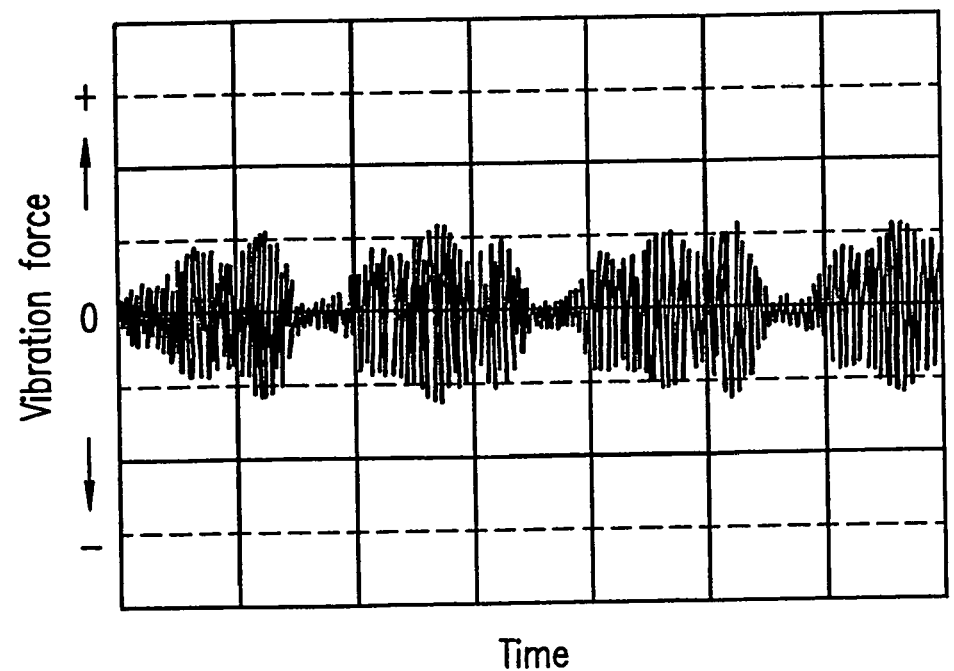
FIG. 17B illustrates a waveform of a vibration force obtained by the synthesized signal.

FIG. 17A illustrates the waveform of an electric signal which is obtained by adding together the eight point frequencies P1–P8, with the lowest frequency P1 being in reverse phase with the next frequency P2, P3 being in phase with P4, P5 being in reverse phase with P6, and P7 being in phase with P8. FIG. 17B illustrates the waveform of the output vibration characteristics obtained for the input electric signal. It can be seen in FIG. 17A that the period with which the peak value of the voltage level increases is reduced from that shown in FIG. 16A. Accordingly, the peak value of the output vibration waveform does not attenuate after the beginning of each period as in FIG. 16B, but a relatively large vibration output is continuously obtained.

Figure 18A:
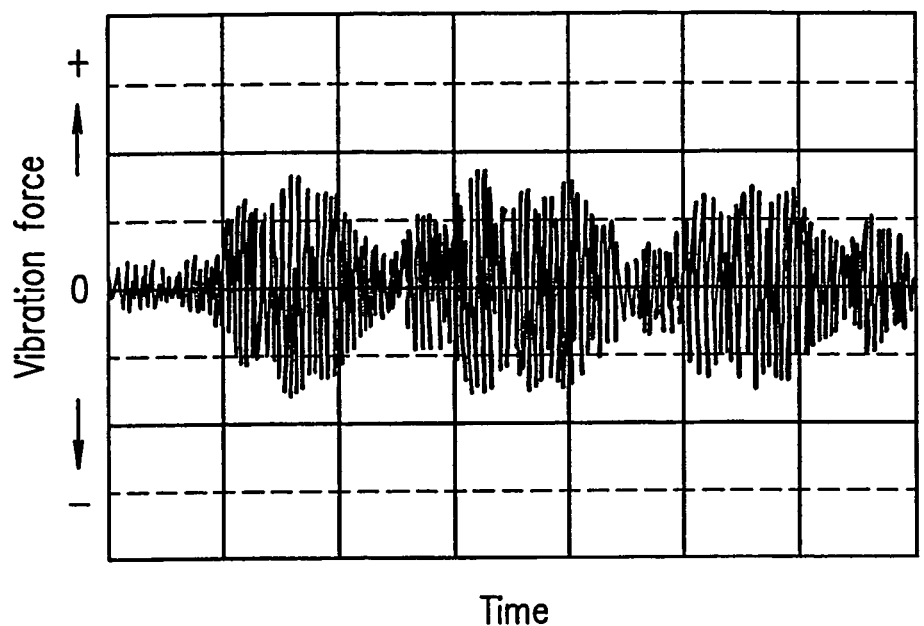
FIG. 18A illustrates a waveform of a vibration force obtained by the electro-mechanical-acoustic transducer according to Embodiment 1 of the present invention when the vibration force vs frequency characteristics of the vibrator are shifted toward the low frequency side.
Figure 18B:
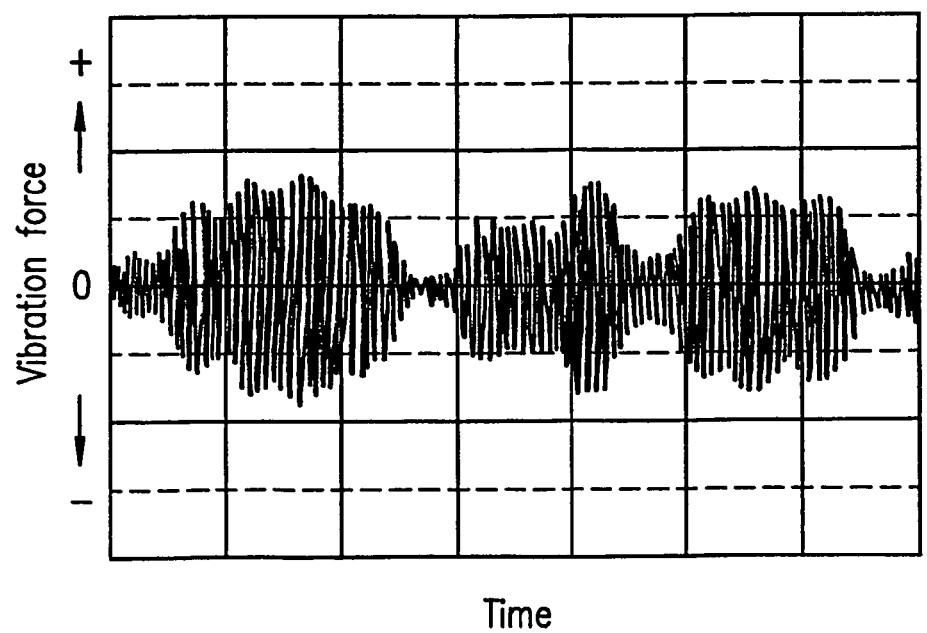
FIG. 18B illustrates a waveform of a vibration force obtained by the electro-mechanical-acoustic transducer according to Embodiment 1 of the present invention when the vibration force vs frequency characteristics of the vibrator are shifted toward the high frequency side.

FIGS. 18A and 18B illustrate the waveforms of the output vibrations obtained when the synthesized signal is applied respectively to the characteristic lines L and H shown in FIG. 15. Similar to the obtained waveform for the characteristic line M shown in FIG. 17B, a large vibration output is continuously produced. This indicates that a stable vibration output is ensured even when the vibration force characteristics of the vibrator 6 vary.

Where the electric signal generator 7 generates an acoustic signal such as a melody signal, a musical signal, or a voice signal, the diaphragm 12 of the vibrator 6 to which the voice coil 13 is bonded vibrates, thereby producing the acoustic signal. In such a case, even when the low frequency component of the acoustic signal is included in the frequency range Wb, the generated vibration force is small. Therefore, the vibratory alert function and the sound alert function are substantially separated from each other. Both a vibration signal and an acoustic signal can be input so as to reproduce the vibration signal and the sound signal simultaneously. Thus, by adjusting the signal frequency band and synthesizing together a plurality of signals, the vibrator 6 can function as a multiple function transducer capable of reproducing a vibration signal and a sound signal.

The input signal may alternatively be a synthesized signal obtained by adding together a plurality of rectangular wave signals if the fundamental frequency thereof satisfies the above-described frequency conditions. In such a case, however, a higher harmonic component included in the signal is likely to introduce a distortion into the signal reproduced from the diaphragm 12. Therefore, it is preferable to insert the high-cut filter 151 which cuts off a higher frequency band in a stage preceding the vibrator 6.

As described above, the electro-mechanical-acoustic transducer 100 of the present embodiment may use the vibrator 6 and the above-described synthesized signal, which includes a plurality of groups of frequency signals, each group including a first pair of adjacent frequency signals and a second pair of adjacent frequency signals. The first pair of adjacent frequency signals are synthesized together in reverse phase, and the second pair of adjacent frequency signals are synthesized together in phase. Thus, it is ensured that even when the plurality of point frequencies have a large interval, at least one of the frequencies is within the frequency range Wb in which a large vibration force is obtained because of the jumping phenomenon. Moreover, the period with which the peak value of the voltage level of the electric signal waveform increases is reduced, whereby a large vibration force is continuously obtained. Moreover, even when the vibration vs frequency characteristics of the vibrator 6 vary, the frequency range of the point frequencies can be set so as to include the frequency range in which a large vibration force is produced, whereby it is possible to always obtain a stable vibration output. Furthermore, a vibration signal and a sound signal can be reproduced selectively based on the frequency range of the signal to be applied.

Embodiment 2

In Embodiment 1 described above, the vibrator 6 employs a nonlinear suspension, with which a jumping phenomenon occurs. Even when a linear suspension, with which a jumping phenomenon does not occur, is used, a continuous vibration output can be obtained by inputting a synthesized signal which is obtained as in the case of a nonlinear suspension from signals that are within a frequency band including two frequencies on the higher and lower sides of the resonance frequency. The resonance frequency characteristics also vary with a linear suspension. However, it is possible to obtain a stable vibration output, as in the case of a nonlinear suspension, by employing a plurality of frequency signals so as to cover all the frequencies resulting from such variations.

Figure 19:
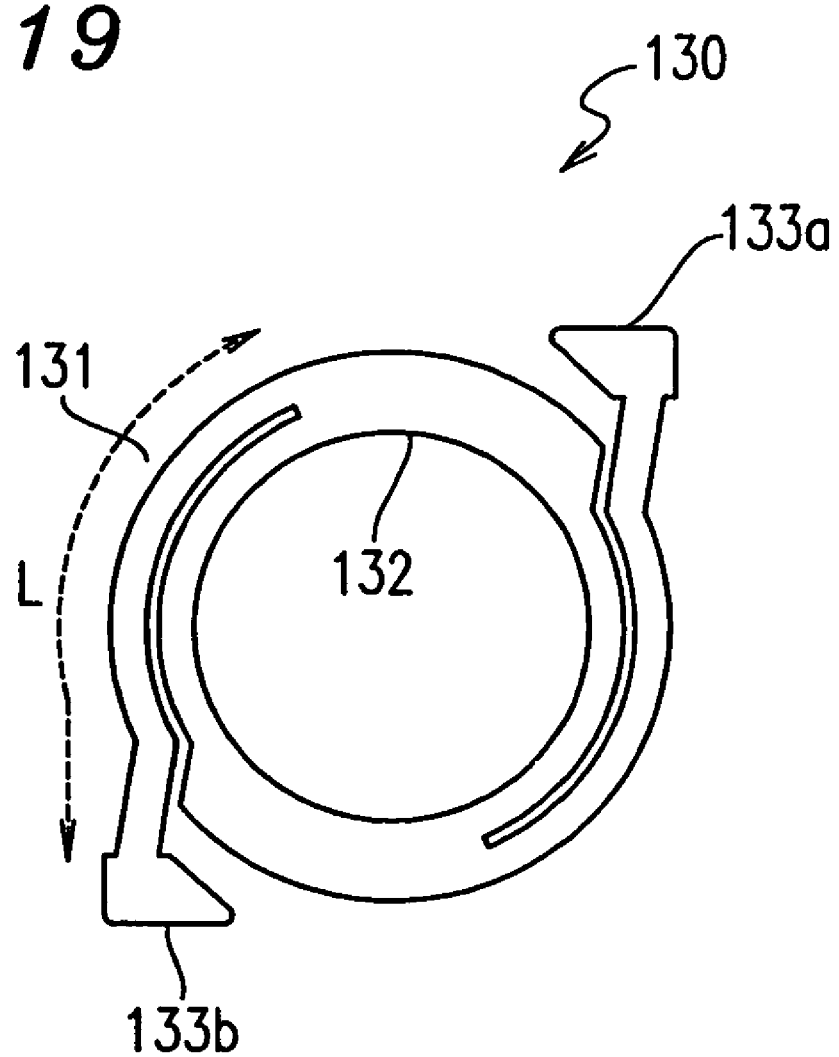
FIG. 19 is a plan view illustrating a linear suspension according to Embodiment 2 of the present invention.

FIG. 19 is a plan view illustrating a linear suspension 130. The magnetic circuit section 8 is fixed to a central portion 132, and extensions 133a and 133b are fixed to the supporting member 11. The linear suspension 130 exhibits a linear force vs displacement characteristic line when the length L of an arm 131 is sufficiently large.

FIG. 20 is a graph illustrating the relationship between the vibration force and the frequency of the vibrator 6 employing the linear suspension 130. FIG. 20 illustrates three characteristic lines I, II and III corresponding to different resonance frequencies f01, f02 and f03, respectively. Since the suspension 130 is a linear suspension, the jumping phenomenon does not occur.

The variations in the resonance frequency shown in FIG. 20 indicate the variations in the characteristics of the vibrator 6. Arrows P1–P8 are point frequency signals to be applied. The point frequencies are selected to define a frequency range which includes all the resonance frequencies f01, f02 and f03 corresponding to the characteristic lines I, II and III, respectively.

Figure 21A:
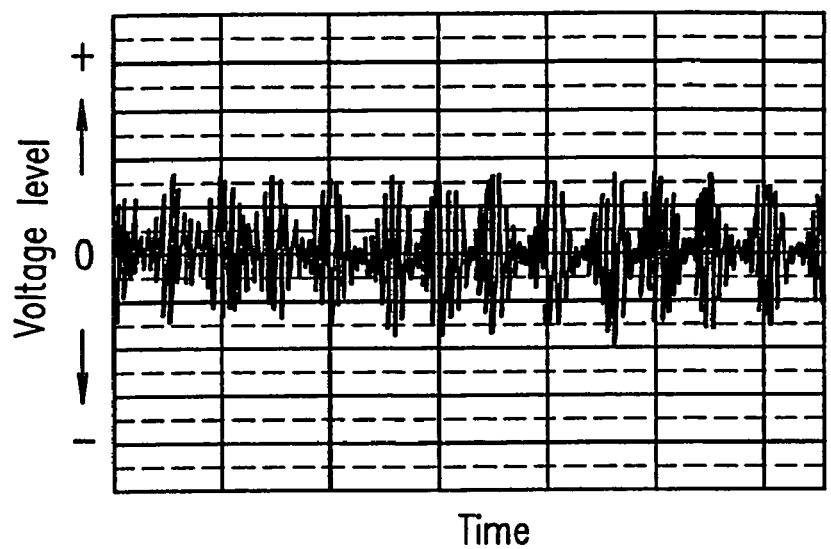
FIG. 21A illustrates a waveform of a voltage level according to Embodiment 2 of the present invention.
Figure 21B:
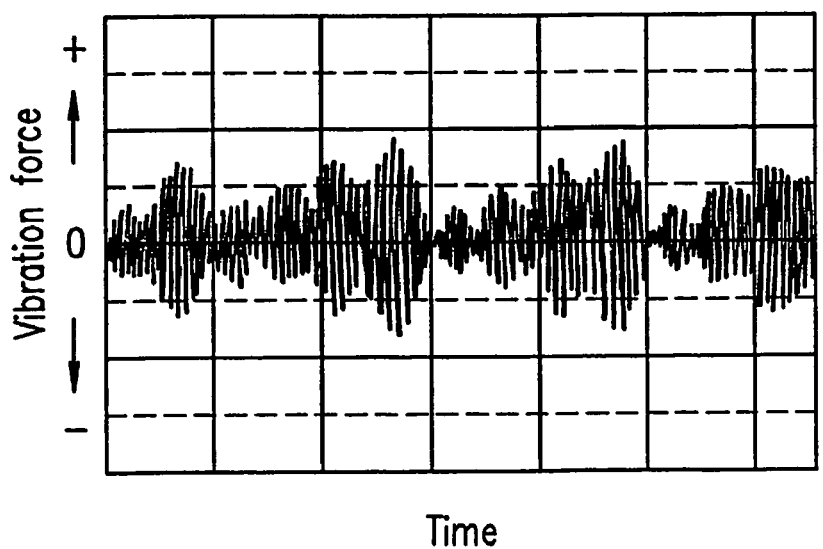
FIG. 21B illustrates a waveform of a vibration force according to Embodiment 2 of the present invention.
Figure 22A:
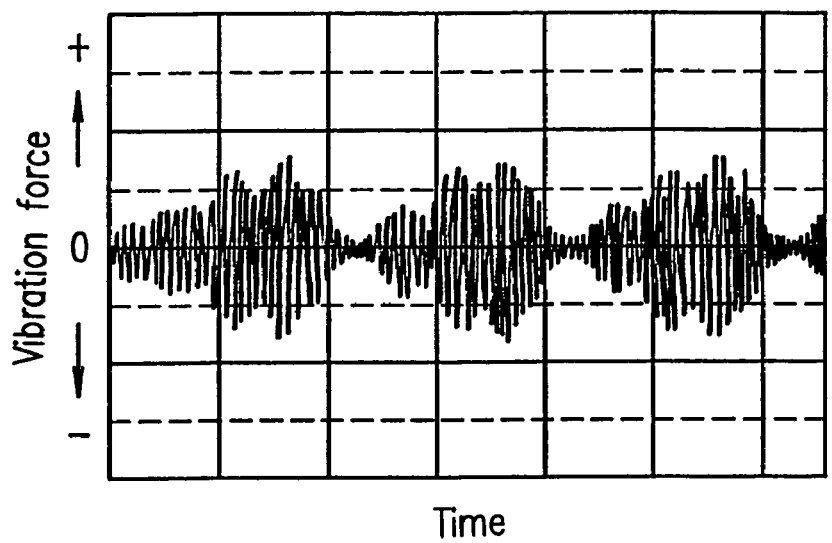
FIG. 22A illustrates a waveform of a vibration force according to Embodiment 2 of the present invention.
Figure 22B:
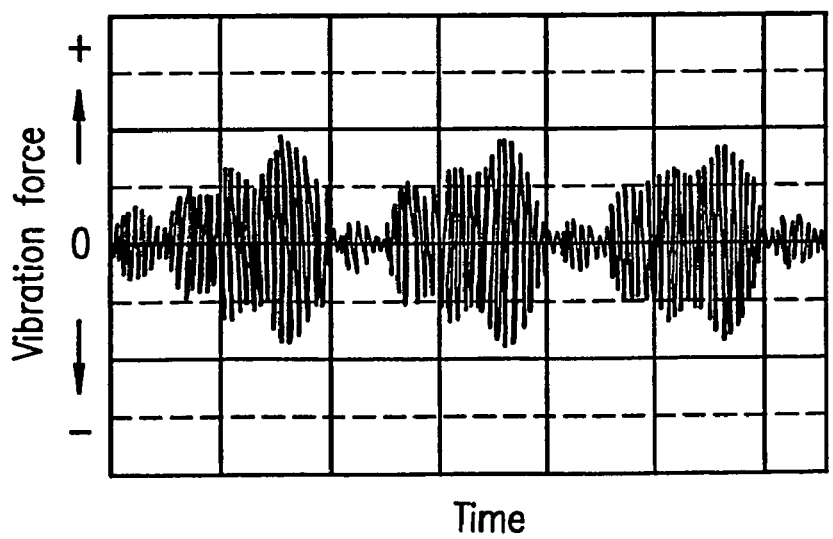
FIG. 22B illustrates a waveform of a vibration force according to Embodiment 2 of the present invention.

FIG. 21A illustrates the waveform of an input signal obtained by synthesizing eight point frequencies while controlling the phase thereof. Each FIGS. 21B, 22A and 22B illustrates the waveform of the vibration force characteristics produced when such an input signal is input to linear suspension 130. In this example, the weight of the magnetic circuit section is 1.4 g, and the mechanical resonance system including the linear suspension and the magnetic circuit section has resonance frequencies f01=125 Hz, f02=135 Hz and f03=145 Hz. The point frequencies P1–P8 range from 120 Hz to 155 Hz at 5 Hz intervals. P2 and P6 are in reverse phase with respect to the other point frequencies.

Figure 23:
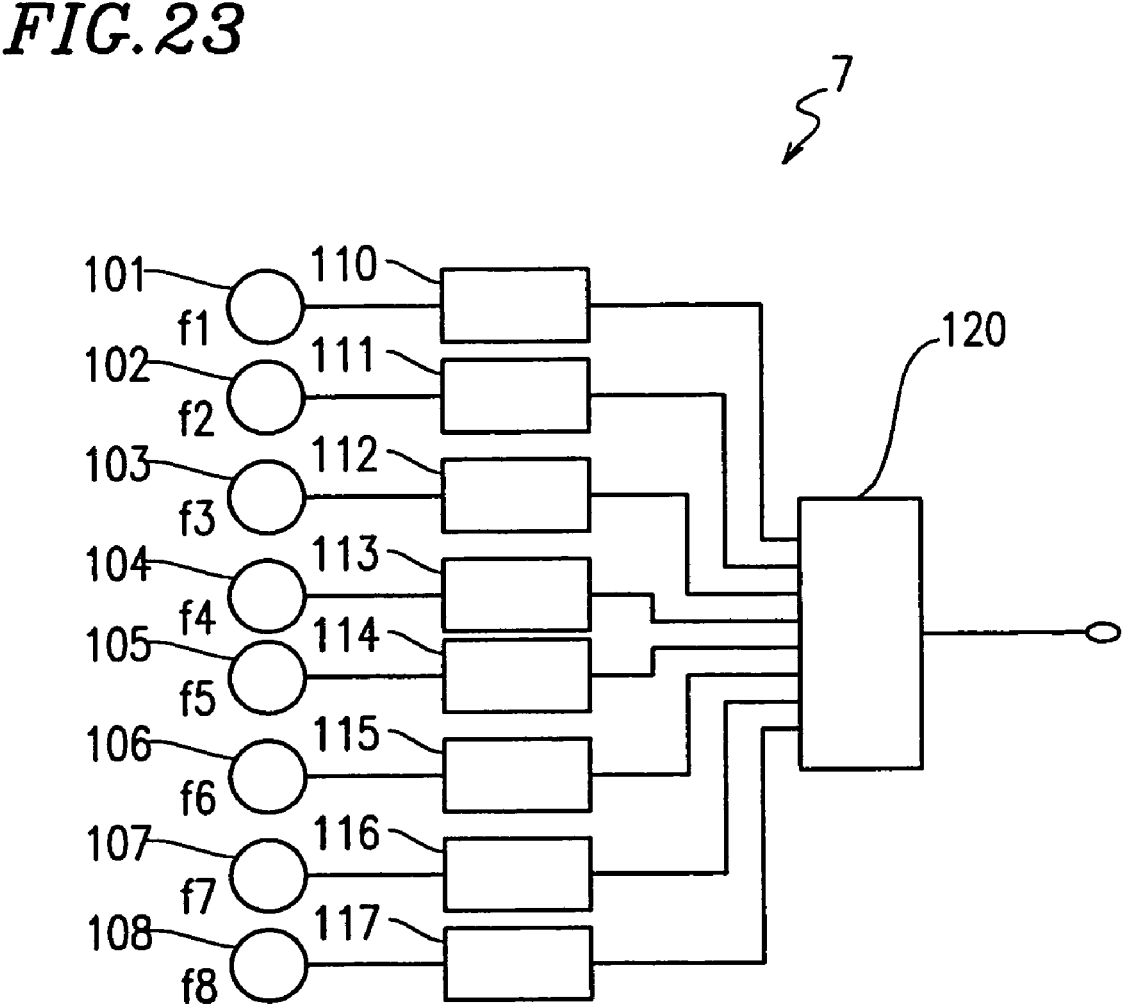
FIG. 23 is a block diagram illustrating an electric signal generator according to Embodiment 2 of the present invention.

FIG. 23 illustrates an example of the electric signal generator 7. Referring to FIG. 23, electric signal generator 7 includes frequency signal generators 101 to 108, phase controllers 110 to 117 and a signal adder 120.

The synthesized signal to be applied to the vibrator 6 is obtained from frequencies P1 to P8 as follows. First, the frequency signal generators 101 to 108 generate the following frequencies, respectively: f1=120 Hz, f2=125 Hz, f3=130 Hz, f4=135 Hz, f5=140 Hz, f6=145 Hz, f7=150 Hz and f8=155 Hz. These frequency signals are input to the phase controllers 110 to 117, respectively. The phase of the frequency signals f2 and f6 is delayed by 180 degrees so as to be in reverse phase with respect to the other frequency signals, with the other frequency signals being all in phase. The frequency signals are synthesized together by the signal adder 120, and the output from the signal adder 120 is provided to the vibrator 6.

FIG. 21A illustrates the waveform of the input signal obtained by adding together the point frequencies P1–P8. FIG. 21B illustrates the waveform of the vibration force characteristics of the vibrator 6 (the resonance frequency f01=135 Hz) when the above-described synthesized signal is applied to the vibrator 6. FIGS. 22A and 22B illustrate the waveform of the vibration force characteristics of the vibrator 6 for other resonance frequencies, i.e., f2=125 Hz and 145 Hz, respectively. It can be seen that even when the resonance frequency of the vibrator 6 varies due to variations in the production process, the attachment to the device to be vibrated, or the conditions under which it is used, a stable vibration force can be obtained because the vibrator 6 is driven by the point frequencies covering a wide frequency band.

Figure 24:
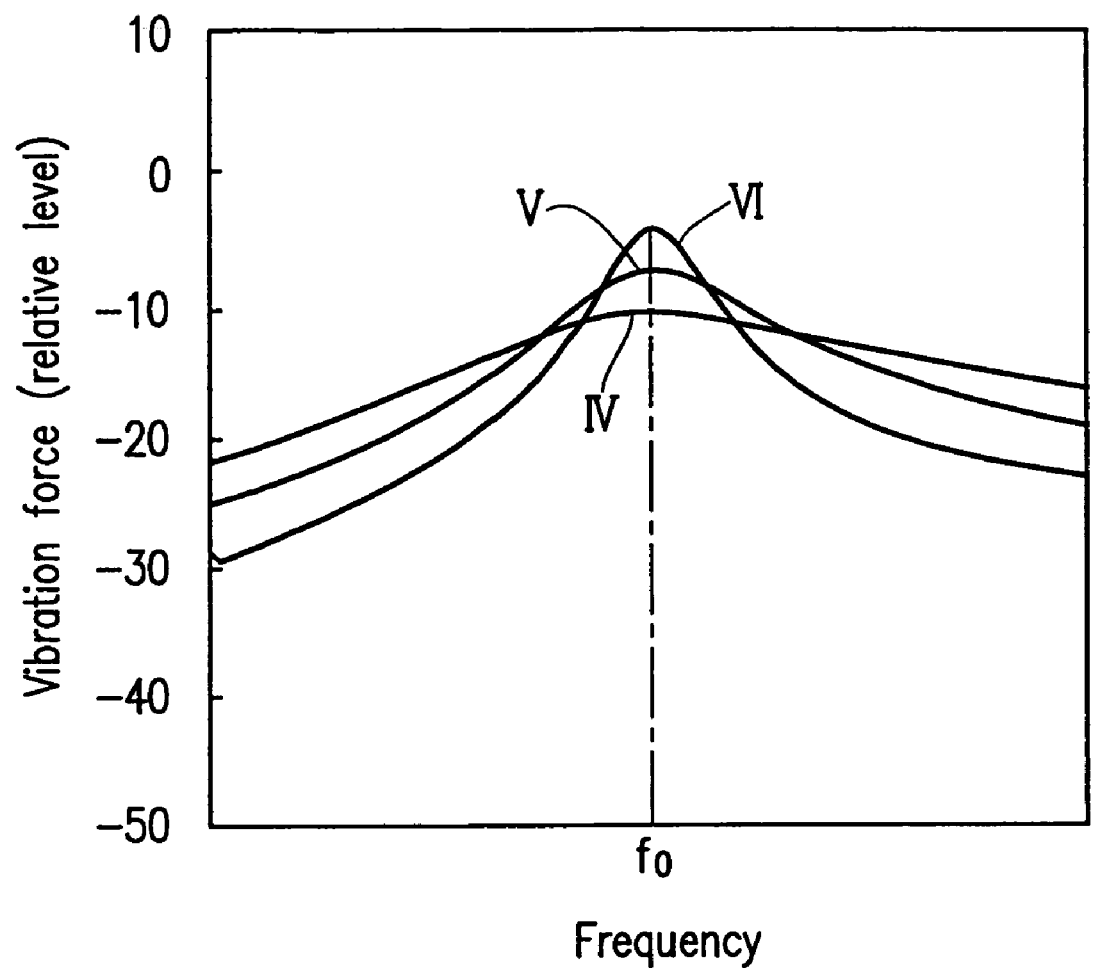
FIG. 24 is a graph illustrating the relationship between the vibration force and the frequency for various linear suspensions having different Q values according to Embodiment 2 of the present invention.
Figure 25A:
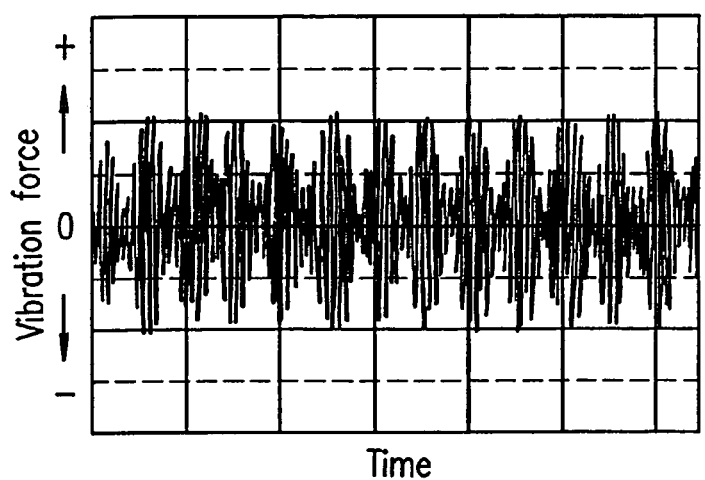
FIG. 25A illustrates a waveform of a vibration force according to Embodiment 2 of the present invention.
Figure 25B:
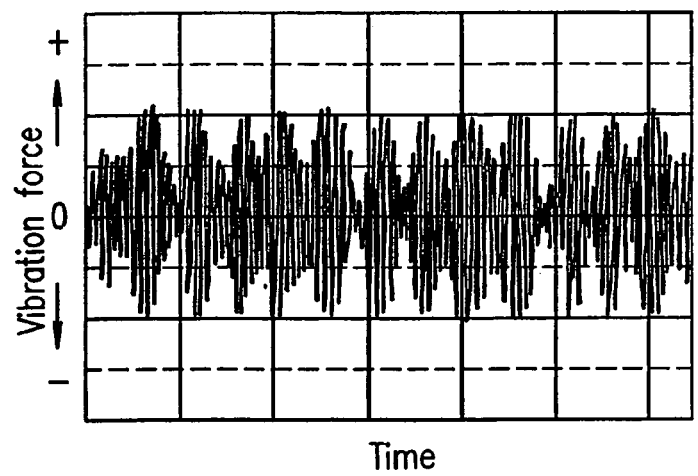
FIG. 25B illustrates a waveform of a vibration force according to Embodiment 2 of the present invention.
Figure 25C:
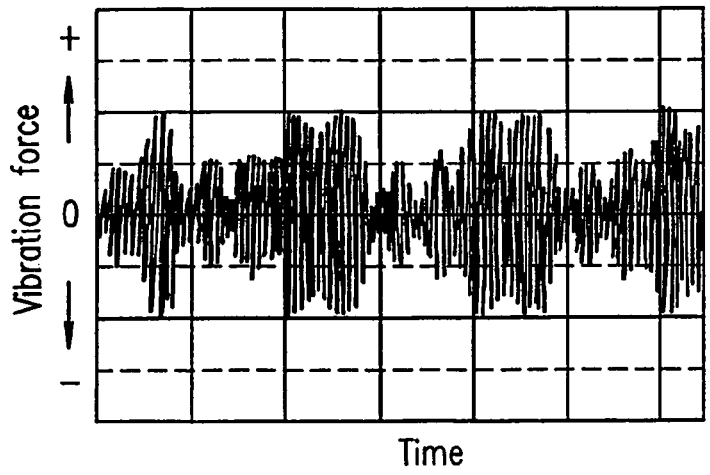
FIG. 25C illustrates a waveform of a vibration force according to Embodiment 2 of the present invention.

The vibration force characteristics of the vibrator 6 vary depending on the Q value of the mechanical resonance system including the suspension and the magnetic circuit section. FIG. 24 illustrates respective vibration force vs frequency characteristics IV, V and VI of different linear suspensions having different Q values, i.e., Q=5, Q=10 and Q=20, respectively. The characteristics shown in FIG. 20 is for Q=20. FIGS. 25A to 25C each illustrate the waveform of the vibration force obtained when an eight-point signal is applied to the vibrator 6 for different Q values, i.e., Q=5, Q=10 and Q=20, respectively. When the Q value is small, the vibration force vs frequency characteristics are flattened. Therefore, it may be preferred to reduce the number of point frequencies (e.g., four points or two points for a Q value less than or equal to 5), whereby it is possible to reduce the variations in the voltage level of the synthesized signal, thereby obtaining a large vibration force. When the Q value is equal to or greater than 10, the vibration force level will be high and the vibration force curve will be sharp in the vicinity of the resonance frequency. Between the curve of Q=20 and the curve of Q=30, for example, there is a substantial difference in the vibration force level for a frequency within a very narrow band near the resonance frequency. However, the vibration force level is substantially the same for frequencies at least several hertzes away from the resonance frequency. Therefore, no substantial difference in the vibration force level occurs when using a signal synthesized from eight or more point frequencies that are distributed across a wide frequency band (e.g., at least several hertz wide in the respective directions from the resonance frequency). Therefore, with a linear suspension, it is preferable to optimally select the number of point frequencies from which to synthesize the input signal based on the Q value. While the Q value depends upon the design of the vibrator, one effective way to reduce the Q value is to employ a strong magnet in the magnetic circuit so as to increase the electromagnetic damping resistance of the voice coil. Another effective way to reduce the Q value is to employ a vibration suppression material having a large internal loss of energy as the material of the suspension so as to increase the mechanical resistance. However, when the electromagnetic damping resistance is increased, the size of the magnetic circuit is also increased, whereby it is difficult to realize a small vibrator. Moreover, when the mechanical resistance is increased, the resonance level is suppressed, thereby requiring a large electric input for obtaining a large vibration force, thereby reducing the efficiency of the vibrator. As described above, with a nonlinear suspension, the frequency range Wb in which a large vibration force can be obtained is widened by the jumping phenomenon of the suspension even when the electromagnetic damping resistance is not large. Therefore, with a nonlinear suspension, as compared to a linear suspension, it is possible to realize a vibrator which is small, yet capable of providing a large vibration force. However, the above-described signal of the present invention is effective irrespective of the linearity of the suspension.

The vibration characteristics can easily be changed by changing the waveform of the input signal. Thus, it is possible to alert the user of an incoming call with various vibrations, whereas various melodies are currently used as ringing tones. For example, it is possible to employ different vibration modes for different callers.

Figure 26A:
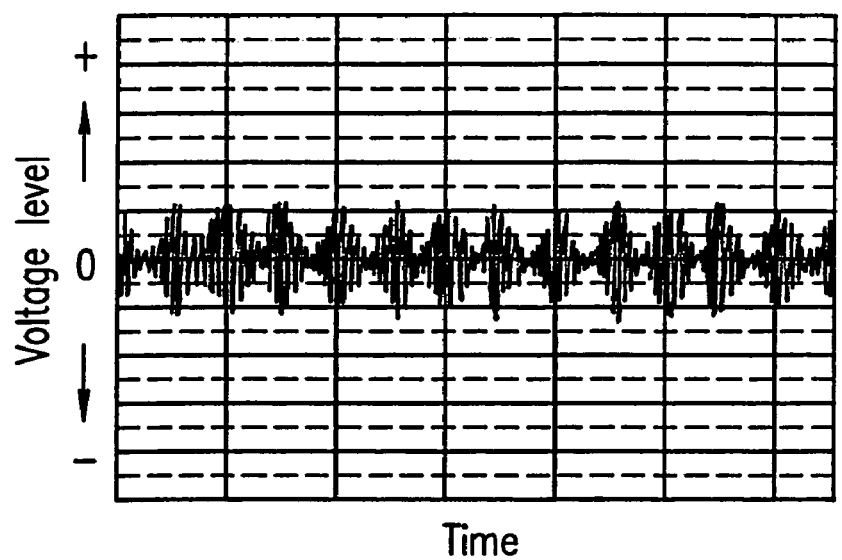
FIG. 26A illustrates a waveform of a voltage level according to Embodiment 2 of the present invention.
Figure 26B:
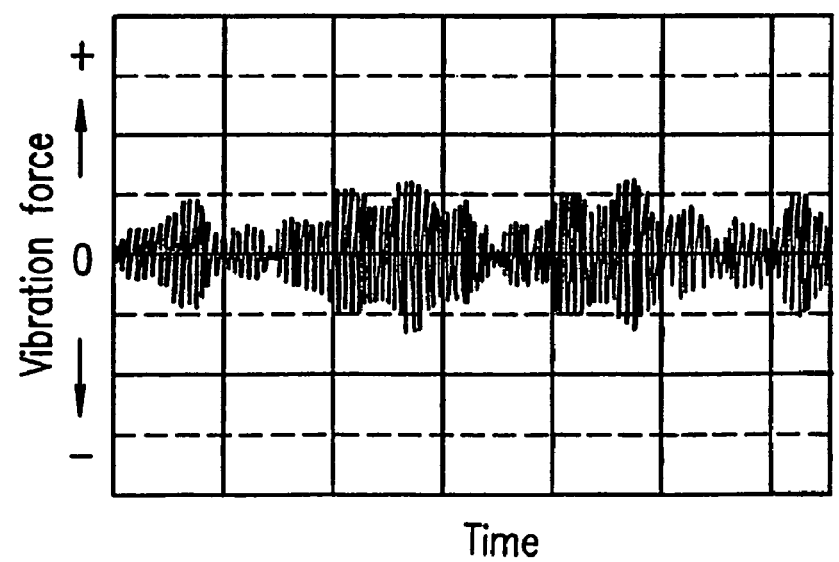
FIG. 26B illustrates a waveform of a vibration force according to Embodiment 2 of the present invention.
Figure 27A:
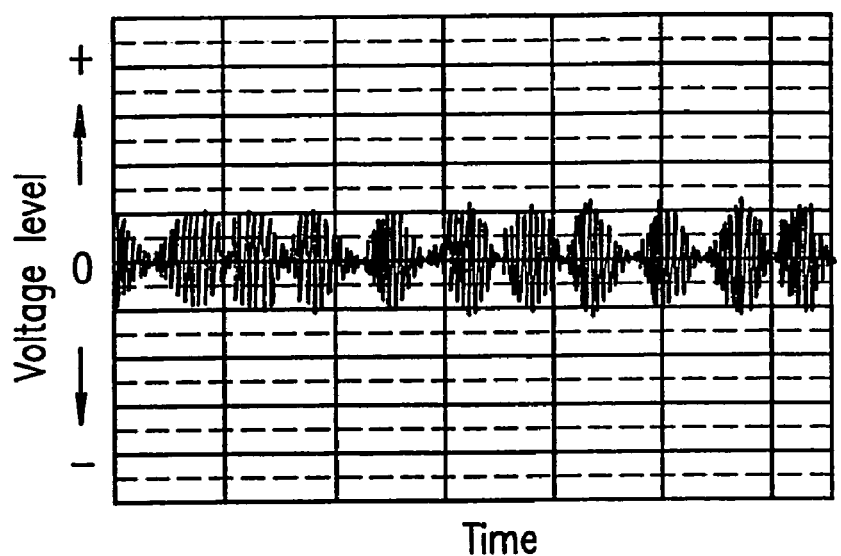
FIG. 27A illustrates a waveform of a voltage level according to Embodiment 2 of the present invention.
Figure 27B:
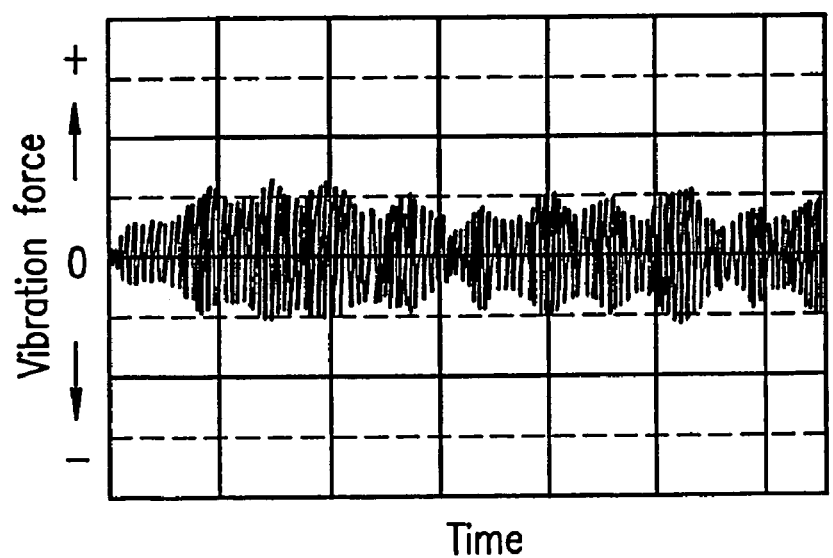
FIG. 27B illustrates a waveform of a vibration force according to Embodiment 2 of the present invention.

FIG. 26A illustrates the waveform of a voltage signal including eight point signals arranged with 5 Hz intervals which is to be input to the vibrator 6 using a non-linear suspension. FIG. 26B illustrates the waveform of the vibration force characteristics of the vibrator 6 in response to the input signal as shown in FIG. 26A. FIG. 27A illustrates the waveform of a voltage signal to be input to the vibrator 6 including eight point signals arranged with 4 Hz intervals. FIG. 27B illustrates the waveform of the vibration force characteristics of the vibrator 6 in response to the input signal as shown in FIG. 27A. As illustrated in the figures, the vibration force characteristics can be changed by changing the interval between the point frequencies. Thus, various vibration modes can be switched to one another easily. The vibration mode can alternatively be changed based on the number of point frequencies, the phase of each point frequency signal, and the like.

The input signal is illustrated to be continuous. Alternatively, the input signal may be an interrupted signal. In such a case, the vibratory alert signal repeatedly vibrates and stops vibrating, which may be more clearly perceived by a human user.

Embodiment 3

Figure 28:
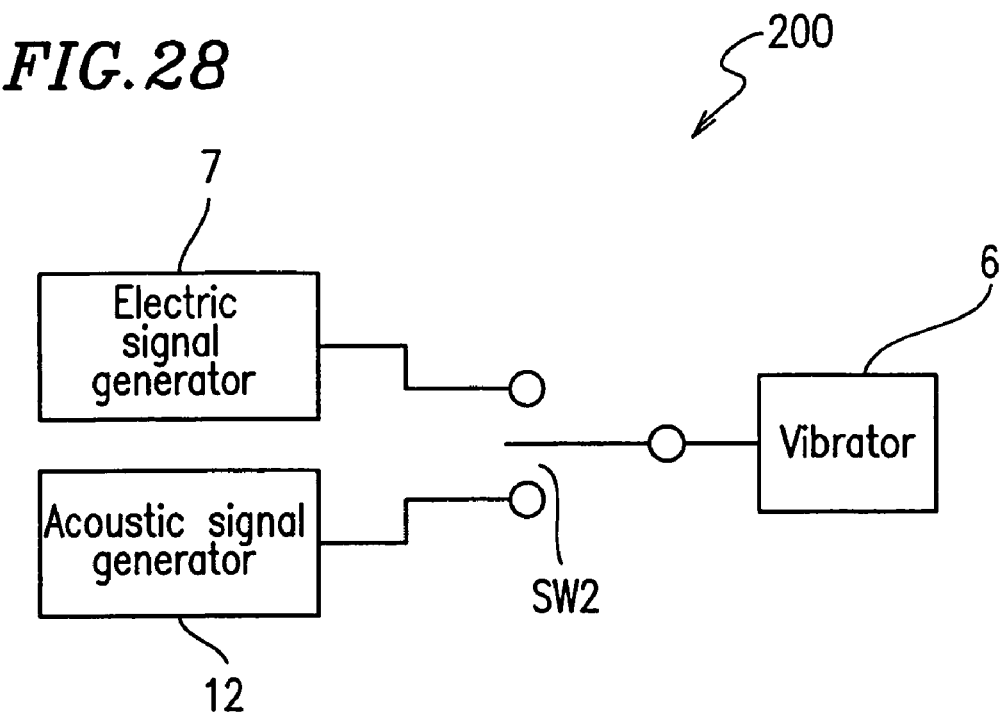
FIG. 28 is a block diagram illustrating the main part of an electro-mechanical-acoustic transducer according to Embodiment 3 of the present invention.

An electro-mechanical-acoustic transducer 200 according to Embodiment 3 of the present invention will now be described with reference to FIG. 28. Elements of the electro-mechanical-acoustic transducer 200 that are already described in Embodiment 1 will be provided with like reference numerals and will not be further described below.

As compared to Embodiment 1, the electro-mechanical-acoustic transducer 200 includes an acoustic signal generator 12 in addition to the electric signal generator 7, so that an electric signal from either one of the electric signal generator 7 or the acoustic signal generator 12 is selectively provided to the vibrator 6 via a switch SW2.

The electric signal generator 7 generates a swept frequency signal or a synthesized signal obtained from a plurality of point frequencies so as to provide stable vibrations. Additionally, the electric signal generator 7 may be capable of generating a voice signal or a music signal. However, in such a case, the circuit configuration may be complicated. Embodiment 3 of the present invention addresses this problem by designing the electro-mechanical-acoustic transducer 200 as follows. When a vibratory alert signal is reproduced, the switch SW2 is controlled so as to transmit a signal from the electric signal generator 7 therethrough. When an acoustic signal such as the music signal or the voice signal is reproduced, the switch SW2 is controlled so as to transmit a signal from the acoustic signal generator 12 therethrough. Thus, the vibratory alert function and the sound alert function are separated from each other, while simplifying the circuit configuration.

The electric signal generator 7 may be a recording medium such as a semiconductor memory which is capable of recording/reproducing an intended signal waveform, and may alternatively be a DSP (digital signal processor).

Embodiment 4

Figure 29:
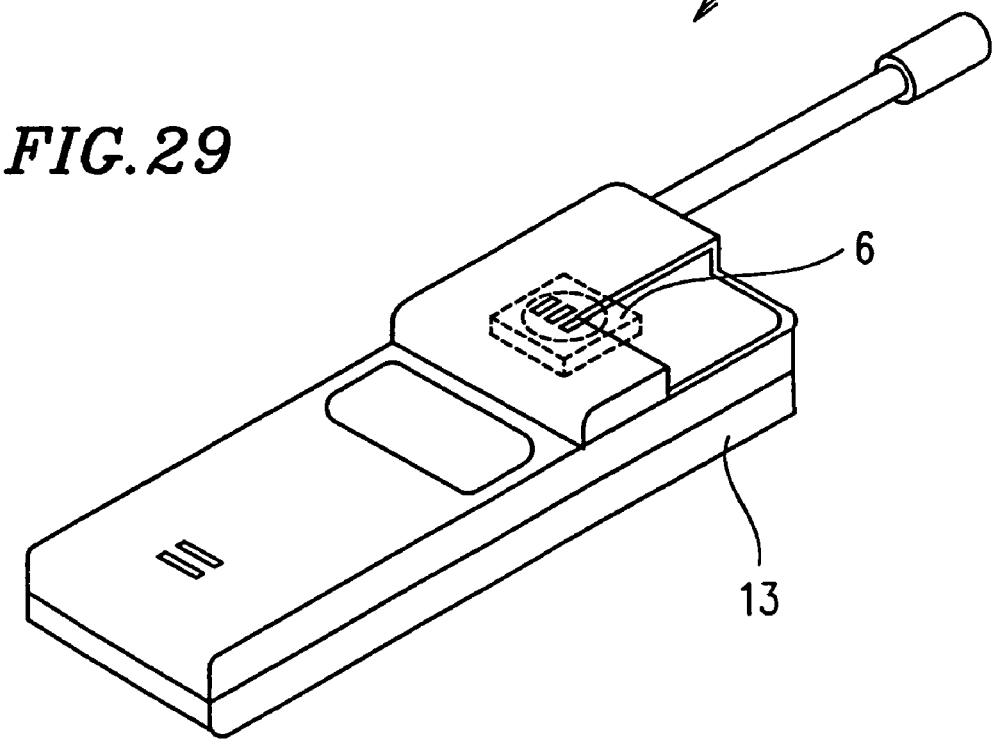
FIG. 29 is a perspective view illustrating a portable telephone according to Embodiment 4 of the present invention, including the electro-mechanical-acoustic transducer of the present invention.
Figure 30:
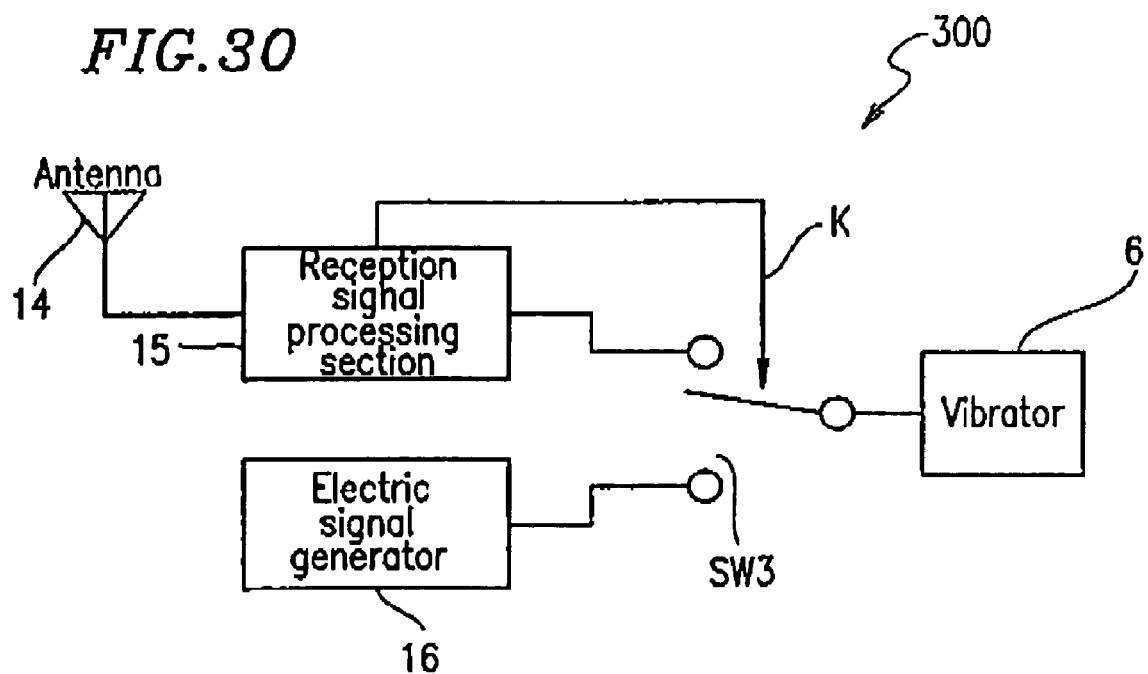
FIG. 30 is a block diagram illustrating the main part of an electro-mechanical-acoustic transducer according to Embodiment 4 of the present invention.
Figure 32:
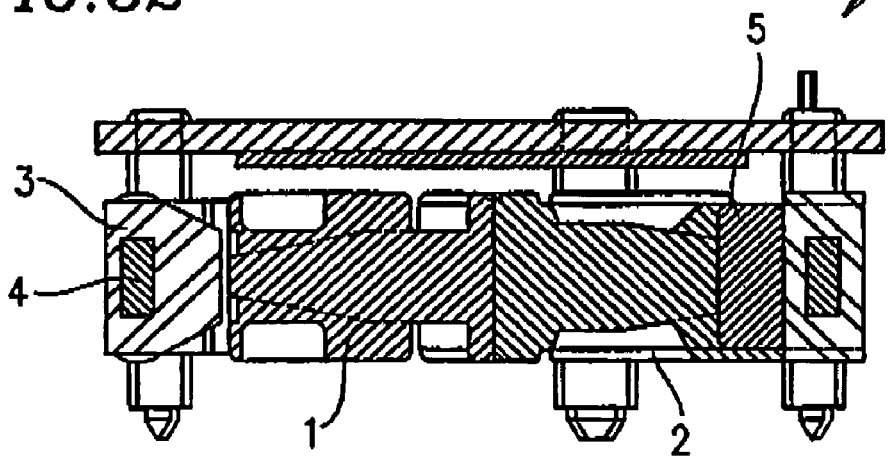
FIG. 32 is a cross-sectional view illustrating a structure of a conventional electro-mechanical-acoustic transducer.

A portable terminal apparatus according to Embodiment 4 of the present invention will now be described with reference to FIGS. 29 and 30. Elements of the portable terminal apparatus that are already described in Embodiment 1 will be provided with like reference numerals and will not be further described below. FIG. 29 is a perspective view illustrating a portable telephone 300 which is an exemplary portable terminal apparatus of the present invention which includes the vibrator 6 described above in Embodiment 1. FIG. 30 is a block diagram illustrating the main part of the portable telephone 300 which uses the vibrator 6 of Embodiment 1.

Referring to FIG. 29, the vibrator 6 is attached to an outer casing 13 of the portable telephone 300. Referring to FIG. 30, the portable telephone 300 includes an antenna 14, a reception signal processing section 15, an electric signal generator 16, and a switch SW3 for selectively transmitting one of the electric signals from the reception signal processing section 15 and the electric signal generator 16 to the vibrator 6.

Next, the operation of the portable telephone 300 will be described. The antenna 14 receives an incoming call signal from a transmitter of another portable telephone (not shown). The incoming call signal includes a reception signal to alert the user of the incoming call, and a voice signal from the caller. The reception signal processing section 15 processes the incoming call signal and generates a signal K in response to the reception signal to alert the user of the incoming call. When the signal K is generated, the switch SW3, which is normally turned OFF (i.e., not connected to either the reception signal processing section 15 or the electric signal generator 16), is connected to either the reception signal processing section 15 or the electric signal generator 16. When the switch SW3 is connected to the electric signal generator 16, a frequency signal as described in Embodiment 1 is generated. This frequency signal causes the magnetic circuit section of the vibrator 6 supported by the nonlinear suspension to vibrate, thereby vibrating the portable telephone 300. Thus, the vibrator 6 functions as a vibrator for generating a vibratory alert signal. When the electric signal generator 16 generates a ringing tone, the vibrator 6 functions as a speaker for reproducing an acoustic signal. When the receiver (user) who has been notified by the vibratory alert signal or the ringing tone of the incoming call turns ON the portable telephone 300, the portable telephone 300 is ready to receive the call, the signal K from the reception signal processing section 15 causes the switch SW3 to be connected to the reception signal processing section 15. The signal from the reception signal processing section 15 is the caller voice signal. Then, the vibrator 6 functions as a receiver. Alternatively, the vibrator 6 may be a loud speaker for reproducing the caller's voice which may be separated from the portable terminal apparatus.

As described above, with the portable telephone 300 according to Embodiment 4 of the present invention, a swept frequency signal or a synthesized signal obtained from a plurality of point frequencies can be generated from the electric signal generator 16 and provided to the vibrator 6 so that it is possible to effectively use the large amount of vibration from the vibrator 6. Therefore, it is possible to reduce the battery power consumption, which is an important issue with portable telephones.

In the example described above, a ringing tone is generated by the electric signal generator 16. Alternatively, a ringing tone may be generated based on a signal from the reception signal processing section 15. In such a case, the reception signal processing section 15 generates a ringing tone, a caller's voice signal and a loud speaker sound signal.

Embodiment 5

A portable terminal apparatus according to Embodiment 5 of the present invention will now be described with reference to FIG. 31.

Figure 31:
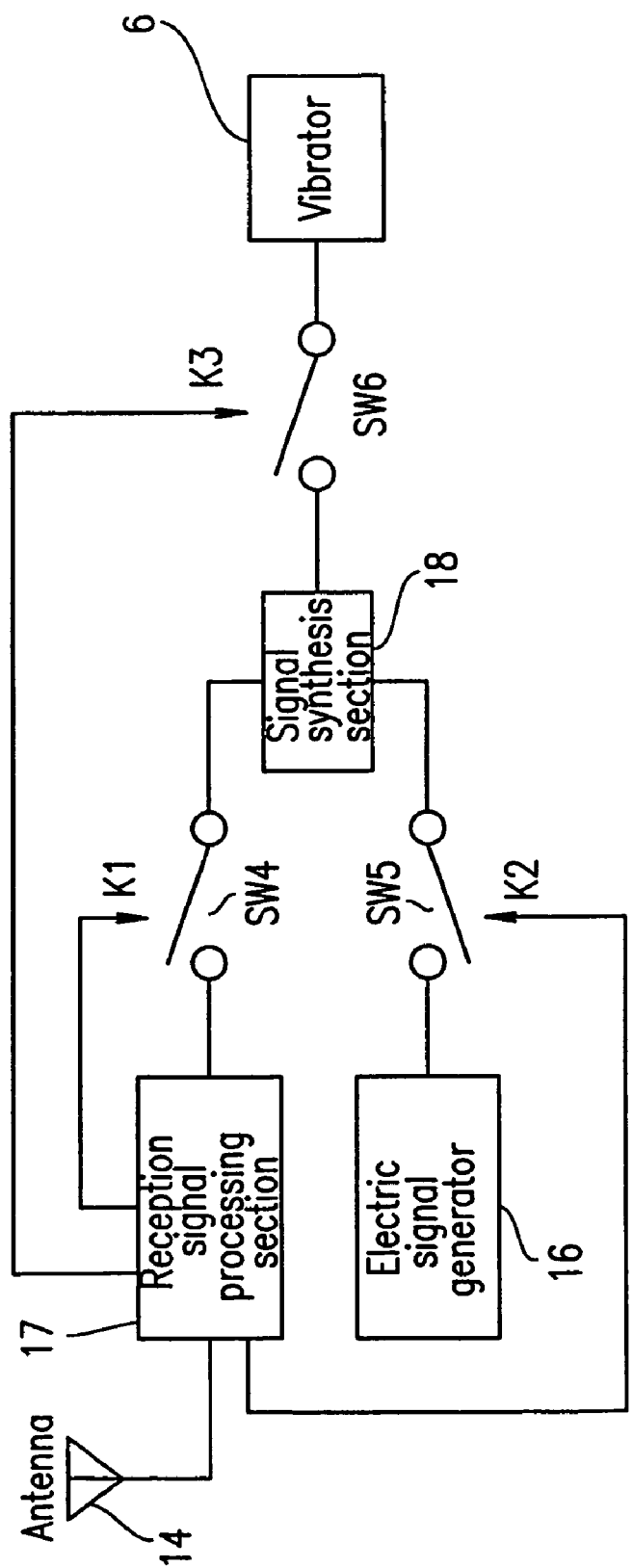
FIG. 31 is a block diagram illustrating the main part of an electro-mechanical-acoustic transducer according to Embodiment 5 of the present invention.

FIG. 31 is a block diagram illustrating the main part of a portable telephone 400 using the vibrator 6 described above in Embodiment 1. Although not shown in FIG. 31, the vibrator 6 is attached to the body of the portable telephone 400, as in Embodiment 4. Referring to FIG. 31, the portable telephone 400 includes the antenna 14, the electric signal generator 16, a reception signal processing section 17, a signal synthesis section 18. The portable telephone 400 further includes a switch SW4 provided between the reception signal processing section 17 and the signal synthesis section 18, a switch SW5 provided between the electric signal generator 16 and the signal synthesis section 18, and a switch SW6 provided between the signal synthesis section 18 and the vibrator 6.

Next, the operation of the portable telephone 400 will be described. The antenna 14 receives an incoming call signal from a transmitter of another portable telephone (not shown). The incoming call signal includes a reception signal to alert the user of the incoming call, and a voice signal from the caller. The reception signal processing section 17 processes the incoming call signal and generates signals K1, K2 and K3 in response to the reception signal to alert the user of the incoming call. When the signals K1, K2 and K3 are generated, the switches SW4, SW5 and SW6 are turned ON/OFF in response to the signals K1, K2 and K3, respectively.

When the signals K1, K2 and K3 are an OFF signal, an ON signal and an ON signal, respectively, the switches SW4, SW5 and SW6 are accordingly turned OFF, ON and ON, respectively, whereby a vibration signal from the electric signal generator 16 is input to the signal synthesis section 18, whereas the signal from the reception signal processing section 17 is stopped by the switch SW4. Thus, the signal synthesis section 18 applies the vibration signal from the electric signal generator 16 to the vibrator 6.

The vibration signal causes the magnetic circuit section of the vibrator 6 supported by the nonlinear suspension to vibrate, thereby vibrating the portable telephone 400. Thus, the vibrator 6 functions as a vibrator for generating a vibratory alert signal.

When the signals K1, K2 and K3 are an ON signal, an OFF signal and an ON signal, respectively, the switches SW4, SW5 and SW6 are accordingly turned ON, OFF and ON, respectively, whereby an acoustic signal from the reception signal processing section 17 is input to the signal synthesis section 18, whereas the signal from the electric signal generator 16 is stopped by the switch SW5. Thus, the signal synthesis section 18 applies the acoustic signal from the reception signal processing section 17 to the vibrator 6. In such a case, the vibrator 6 functions as a speaker for reproducing an acoustic signal. Specifically, the vibrator 6 functions as a ringing tone generator, a receiver or a loud speaker.

When the signals K1, K2 and K3 are all an ON signal, the switches SW4, SW5 and SW6 are all turned ON, whereby an acoustic signal from the reception signal processing section 17 and a vibration signal from the electric signal generator 16 are simultaneously input to the signal synthesis section 18, which then synthesizes the acoustic signal and the vibration signal to provide a synthesized signal, which is applied to the vibrator 6. Thus, the vibrator 6 can produce both a vibration and a sound to alert the user of an incoming call. Alternatively, when the user receives a call from a second caller while taking with a first caller, the vibrator 6 can alert the user of the incoming call from the second caller with a vibration. Such a vibration does not interfere with the voice of the first caller. Thus, it is possible to realize a portable terminal apparatus capable of receiving a second call while the user is already on a call without deteriorating the sound quality during the call.

In Embodiments 1–5 above, the vibrator 6 is an electro-kinetic transducer which utilizes a magnetic force generated in a voice coil inserted into a magnetic field. Alternatively, the vibrator 6 may be a piezoelectric transducer, an electromagnetic transducer, or the like, as long as the transducer can provide nonlinear vibration force characteristics as those described above.

As described above, the electro-mechanical-acoustic transducer of the present invention includes a vibrator which includes a nonlinear suspension, so as to obtain a large vibration force in a wide frequency band. Also when a linear suspension is used, a synthesized signal obtained by adding together a plurality of point frequencies can be input so that it is possible to eliminate substantial variations in the vibration force due to variations in the vibration characteristics of the vibrator and to simplify the driving circuit therefor, whereby a stable vibration force can always be obtained. Therefore, the electro-mechanical-acoustic transducer of the present invention can be used in a portable telephone so as to reduce the power consumption while simplifying the circuit configuration, thereby reducing the size and weight of the portable telephone.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A driving circuit for driving a vibrator having a mechanical vibration system which resonates at a resonance frequency, wherein:
   the driving circuit outputs to the vibrator a plurality of signals of different frequencies which are included in a frequency range including the resonance frequency; and
   the vibrator has a function of converting an electric signal into at least one of a sound and a vibration; and
   at least two of the plurality of signals, having frequencies near the resonance frequency that are different from one another, are output concurrently to produce the vibration of the vibrator.

2. A driving circuit according to claim 1, wherein the at least two signals include a first signal having a frequency which is lower than the resonance frequency and a second signal having a frequency which is higher than the resonance frequency.

3. A driving circuit according to claim 1, wherein:
   the at least two signals include a first signal and a second signal; and
   the driving circuit outputs to the vibrator a synthesized signal obtained by adding together the first signal and the second signal.

4. A driving circuit according to claim 1, wherein:
   the at least two signals include a first signal and a second signal; and
   the driving circuit outputs to the vibrator a synthesized signal obtained by adding together the first signal and the second signal while shifting a phase of the first signal and a phase of the second signal from each other.

5. A driving circuit according to claim 1, wherein:
   the at least two signals include a first signal and a second signal; and
   at least one of the first signal and the second signal includes a sine wave signal.

6. A driving circuit according to claim 1, wherein:
   the at least two signals include a first signal and a second signal; and
   at least one of the first signal and the second signal includes a rectangular wave signal.

7. A driving circuit according to claim 3, further comprising a limiter for limiting a peak output voltage of the synthesized signal.

8. A driving circuit for driving a vibrator having a mechanical vibration system which resonates at a resonance frequency, wherein:
   the driving circuit outputs to the vibrator at least two signals of different frequencies which are included in a frequency range including the resonance frequency; and
   the vibrator has a function of converting an electric signal into at least one of a sound and a vibration;
   the at least two signals include a first signal and a second signal;
   the driving circuit outputs to the vibrator a synthesized signal obtained by adding together the first signal and the second signal; and
   wherein the synthesized signal is a sine wave signal which is obtained by synthesizing together a plurality of groups of frequency signals, each group including a first pair of adjacent frequency signals and a second pair of adjacent frequency signals, the first pair of adjacent frequency signals being synthesized together in reverse phase, and the second pair of adjacent frequency signals being synthesized together in phase.

9. A driving circuit according to claim 1, wherein the vibrator includes a magnetic circuit section and at least one suspension.

10. A driving circuit according to claim 9, wherein the suspension includes a linear suspension.

11. A driving circuit according to claim 1, wherein the driving circuit is an electric signal generator for generating a frequency signal for a vibration or an electric-acoustic signal for a sound.

12. A driving circuit for driving a vibrator having a mechanical vibration system having predetermined vibration force vs frequency characteristics, wherein:
the mechanical vibration system has different vibration force vs frequency characteristics for an increasing frequency sweep and for a decreasing frequency sweep within a predetermined frequency range;
the predetermined frequency range is defined between a lower limit frequency which represents a lowest frequency in the predetermined frequency range and an upper limit frequency which represents a highest frequency in the predetermined frequency range;
the driving circuit outputs to the vibrator a first signal having a frequency within the frequency range and a second signal having a frequency which is lower than the lower limit frequency;
the second signal is output to the vibrator concurrently with or prior to the first signal;
the vibrator has a function of converting an electric signal into at least one of a sound and a vibration; and
the first and second signals, having frequencies near the resonance frequency that are different from one another, produce the vibration of the vibrator.

13. A driving circuit according to claim 12, wherein the vibrator includes a magnetic circuit and at least one suspension.

14. A driving circuit according to claim 13, wherein the suspension includes a nonlinear suspension.

15. A driving circuit according to claim 13, wherein the suspension has stiffness S such that when the stiffness S is expressed by a multidimensional function with respect to a displacement X, an $X^2$ term of the multidimensional function has a non-zero value.

16. A driving circuit according to claim 12, wherein the driving circuit is an electric signal generator for generating a frequency signal for a vibration or an electric-acoustic signal for a sound.

17. A driving circuit according to claim 12, wherein the second signal includes a swept frequency signal whose frequency continuously varies over time.

18. A driving circuit according to claim 12, wherein the second signal includes a plurality of point frequency signals.

19. A driving circuit according to claim 12, wherein at least one of the first signal and the second signal includes an increasing signal whose frequency increases over time.

20. A driving circuit for driving a vibrator having a mechanical vibration system having predetermined vibration force vs frequency characteristics, wherein:
the mechanical vibration system has different vibration force vs frequency characteristics for an increasing frequency sweep and for a decreasing frequency sweep within a predetermined frequency range;
the predetermined frequency range is defined between a lower limit frequency which represents a lowest frequency in the predetermined frequency range and an upper limit frequency which represents a highest frequency in the predetermined frequency range;
the driving circuit outputs to the vibrator a first signal having a frequency within the frequency range and a second signal having a frequency which is lower than the lower limit frequency;
the second signal is output to the vibrator concurrently with or prior to the first signal;
the vibrator has a function of converting an electric signal into at least one of a sound and a vibration;
the first signal includes a swept frequency signal whose frequency continuously varies over time;
the first signal has a first turning frequency at which the frequency of the first signal stops increasing and starts decreasing and a second turning frequency at which the frequency of the first signal stops decreasing and starts increasing;
the first turning frequency is lower than the upper limit frequency; and
the second turning frequency is higher than the lower limit frequency.

21. A driving circuit according to claim 12, wherein the first signal includes at least one point frequency signal.

22. A driving circuit according to claim 12, wherein the driving circuit outputs to the vibrator a synthesized signal obtained by adding together the first signal and the second signal.

23. A driving circuit according to claim 12, wherein the driving circuit outputs to the vibrator a synthesized signal obtained by adding together the first signal and the second signal while shifting a phase of the first signal and a phase of the second signal from each other.

24. A driving circuit according to claim 12, wherein at least one of the first signal and the second signal includes a sine wave signal.

25. A driving circuit according to claim 12, wherein at least one of the first signal and the second signal includes a rectangular wave signal.

26. A driving circuit according to claim 22, further comprising a limiter for limiting a peak output voltage of the synthesized signal.

27. A driving circuit for driving a vibrator having a mechanical vibration system having predetermined vibration force vs frequency characteristics, wherein:
the mechanical vibration system has different vibration force vs frequency characteristics for an increasing frequency sweep and for a decreasing frequency sweep within a predetermined frequency range;
the predetermined frequency range is defined between a lower limit frequency which represents a lowest frequency in the predetermined frequency range and an upper limit frequency which represents a highest frequency in the predetermined frequency range;
the driving circuit outputs to the vibrator a first signal having a frequency within the frequency range and a second signal having a frequency which is lower than the lower limit frequency;
the second signal is output to the vibrator concurrently with or prior to the first signal;
the vibrator has a function of converting an electric signal into at least one of a sound and a vibration;
the driving circuit outputs to the vibrator a synthesized signal obtained by adding together the first signal and the second signal while shifting a phase of the first signal and a phase of the second signal from each other; and the synthesized signal is a sine wave signal which is obtained by synthesizing together a plurality of groups of frequency signals, each group including a first pair of adjacent frequency signals and a second pair of adjacent frequency signals, the first pair of adjacent frequency signals being synthesized together in reverse phase, and the second pair of adjacent frequency signals being synthesized together in phase.

28. An electro-mechanical-acoustic transducer, comprising:
a vibrator having a mechanical vibration system which resonates at a resonance frequency; and
a driving circuit for driving the vibrator, wherein:
the driving circuit outputs to the vibrator a plurality of signals of different frequencies which are included in a frequency range including the resonance frequency, and
at least two of the plurality of signals, having frequencies near the resonance frequency that are different from one another, are output concurrently to produce the vibration of the vibrator.

29. An electro-mechanical-acoustic transducer according to claim 28, wherein the at least two signals include a first signal having a frequency which is lower than the resonance frequency and a second signal having a frequency which is higher than the resonance frequency.

30. An electro-mechanical-acoustic transducer according to claim 28, wherein:
the at least two signals include a first signal having a frequency which is lower than the resonance frequency and a second signal having a frequency which is higher than the resonance frequency;
the driving circuit outputs to the vibrator a synthesized signal obtained by adding together the first signal and the second signal; and
the driving circuit selectively changes the synthesized signal by changing at least one of a frequency of the first signal, a frequency of the second signal, a frequency interval between the frequency of the first signal and the frequency of the second signal, a phase of the first signal, a phase of the second signal, a voltage level of the first signal, and a voltage level of the second signal.

31. An electro-mechanical-acoustic transducer, comprising:
a vibrator having a mechanical vibration system having predetermined vibration force vs frequency characteristics; and
a driving circuit for driving the vibrator, wherein:
the mechanical vibration system has different vibration force vs frequency characteristics for an increasing frequency sweep and for a decreasing frequency sweep within a predetermined frequency range;
the predetermined frequency range is defined between a lower limit frequency which represents a lowest frequency in the predetermined frequency range and an upper limit frequency which represents a highest frequency in the predetermined frequency range;
the driving circuit outputs to the vibrator a first signal having a frequency within the frequency range and a second signal having a frequency which is lower than the lower limit frequency; and
the second signal is output to the vibrator concurrently with the first signal; and
the first and second signals, having frequencies near the resonance frequency that are different from one another, produce the vibration of the vibrator.

32. An electromechanical-acoustic transducer according to claim 31, wherein:
the driving circuit outputs to the vibrator a synthesized signal obtained by adding together the first signal and the second signal; and
the driving circuit selectively changes the synthesized signal by changing at least one of a frequency of the first signal, a frequency of the second signal, a frequency interval between the frequency of the first signal and the frequency of the second signal, a phase of the first signal, a phase of the second signal, a voltage level of the first signal, and a voltage level of the second signal.

33. A portable terminal apparatus, comprising:
a vibrator having a mechanical vibration system which resonates at a resonance frequency;
an antenna for receiving an incoming call signal;
a reception signal processing section for processing the incoming call signal so as to output an electric signal to the vibrator; and
a driving circuit for driving the vibrator, wherein:
the driving circuit outputs to the vibrator a plurality of signals of different frequencies which are included in a frequency range including the resonance frequency, and
at least two of the plurality of signals, having frequencies near the resonance frequency that are different from one another, are output concurrently to produce the vibration of the vibrator.

34. A portable terminal apparatus according to claim 33, wherein the at least two signals include a first signal having a frequency which is lower than the resonance frequency and a second signal having a frequency which is higher than the resonance frequency.

35. A portable terminal apparatus according to claim 33, further comprising a switching section for connecting the vibrator to one of the driving circuit and the reception signal processing section based on an output from the reception signal processing section.

36. A portable terminal apparatus according to claim 33, further comprising a signal synthesis section for synthesizing together the electric signal output from the reception signal processing section and the output from the driving circuit.

37. A portable terminal apparatus according to claim 36, further comprising:
a first switch provided between the reception signal processing section and the signal synthesis section;
a second switch provided between the driving circuit and the signal synthesis section; and
a third switch provided between the signal synthesis section and the vibrator.

38. A portable terminal apparatus according to claim 37, wherein the first switch, the second switch and the third switch operate based on a signal which is output from the reception signal processing section.

39. A portable terminal apparatus according to claim 33, wherein:
the at least two signals include a first signal having a frequency which is lower than the resonance frequency and a second signal having a frequency which is higher than the resonance frequency;
the driving circuit outputs to the vibrator a synthesized signal obtained by adding together the first signal and the second signal; and
the driving circuit selectively changes the synthesized signal by changing at least one of a frequency of the first signal, a frequency of the second signal, a frequency interval between the frequency of the first signal and the frequency of the second signal, a phase of the first signal, a phase of the second signal, a voltage level of the first signal, and a voltage level of the second signal.

40. A portable terminal apparatus, comprising:
a vibrator having a mechanical vibration system having predetermined vibration force vs frequency characteristics;
an antenna for receiving an incoming call signal;
a reception signal processing section for processing the incoming call signal so as to output an electric signal to the vibrator; and
a driving circuit for driving the vibrator, wherein;
the mechanical vibration system has different vibration force vs frequency characteristics for an increasing frequency sweep and for a decreasing frequency sweep within a predetermined frequency range;
the predetermined frequency range is defined between a lower limit frequency which represents a lowest frequency in the predetermined frequency range and an upper limit frequency which represents a highest frequency in the predetermined frequency range;
the driving circuit outputs to the vibrator a first signal having a frequency within the frequency range and a second signal having a frequency which is lower than the lower limit frequency; and
the second signal is output to the vibrator concurrently with the first signal; and
the first and second signals, having frequencies near the resonance frequency that are different from one another, produce the vibration of the vibrator.

41. A portable terminal apparatus according to claim 40, further comprising a switching section for connecting the vibrator to one of the driving circuit and the reception signal processing section based on an output from the reception signal processing section.

42. A portable terminal apparatus according to claim 40, further comprising a signal synthesis section for synthesizing together the electric signal output from the reception signal processing section and the output from the driving circuit.

43. A portable terminal apparatus according to claim 42, further comprising:
a first switch provided between the reception signal processing section and the signal synthesis section;
a second switch provided between the driving circuit and the signal synthesis section; and
a third switch provided between the signal synthesis section and the vibrator.

44. A portable terminal apparatus according to claim 40, wherein:
the driving circuit outputs to the vibrator a synthesized signal obtained by adding together the first signal and the second signal; and
the driving circuit selectively changes the synthesized signal by changing at least one of a frequency of the first signal, a frequency of the second signal, a frequency interval between the frequency of the first signal and the frequency of the second signal, a phase of the first signal, a phase of the second signal, a voltage level of the first signal, and a voltage level of the second signal.

45. A driving circuit according to claim 2, wherein:
the driving circuit outputs to the vibrator a synthesized signal obtained by adding together the first signal and the second signal.

46. A driving circuit according to claim 2, wherein:
the driving circuit outputs to the vibrator a synthesized signal obtained by adding together the first signal and the second signal while shifting a phase of the first signal and a phase of the second signal from each other.

47. A driving circuit according to claim 2, wherein:
at least one of the first signal and the second signal includes a sine wave signal.

48. A driving circuit according to claim 2, wherein:
at least one of the first signal and the second signal includes a rectangular wave signal.

49. An electro-mechanical-acoustic transducer, comprising:
a vibrator having a mechanical vibration system which resonates at a resonance frequency; and
a driving circuit for driving the vibrator, wherein:
the driving circuit outputs to the vibrator at least two signals of different frequencies which are included in a frequency range including the resonance frequency;
the at least two signals include a first signal and a second signal;
the driving circuit outputs to the vibrator a synthesized signal obtained by adding together the first signal and the second signal; and
the synthesized signal is a sine wave signal which is obtained by synthesizing together a plurality of groups of frequency signals, each group including a first pair of adjacent frequency signals and a second pair of adjacent frequency signals, the first pair of adjacent frequency signals being synthesized together in reverse phase, and the second pair of adjacent frequency signals being synthesized together in phase.

50. An electro-mechanical-acoustic transducer, comprising:
a vibrator having a mechanical vibration system having predetermined vibration force vs frequency characteristics; and
a driving circuit for driving the vibrator, wherein:
the mechanical vibration system has different vibration force vs frequency characteristics for an increasing frequency sweep and for a decreasing frequency sweep within a predetermined frequency range;
the predetermined frequency range is defined between a lower limit frequency which represents a lowest frequency in the predetermined frequency range and an upper limit frequency which represents a highest frequency in the predetermined frequency range;
the driving circuit outputs to the vibrator a first signal having a frequency within the frequency range and a second signal having a frequency which is lower than the lower limit frequency;
the second signal is output to the vibrator concurrently with or prior to the first signal;
the first signal includes a swept frequency signal whose frequency continuously varies over time;
the first signal has a first turning frequency at which the frequency of the first signal stops increasing and starts decreasing and a second turning frequency at which the frequency of the first signal stops decreasing and starts increasing;
the first turning frequency is lower than the upper limit frequency; and
the second turning frequency is higher than the lower limit frequency.

51. An electro-mechanical-acoustic transducer, comprising;
- a vibrator having a mechanical vibration system having predetermined vibration force vs frequency characteristics; and
- a driving circuit for driving the vibrator, wherein:
- the mechanical vibration system has different vibration force vs frequency characteristics for an increasing frequency sweep and for a decreasing frequency sweep within a predetermined frequency range;
- the predetermined frequency range is defined between a lower limit frequency which represents a lowest frequency in the predetermined frequency range and an upper limit frequency which represents a highest frequency in the predetermined frequency range;
- the driving circuit outputs to the vibrator a first signal having a frequency within the frequency range and a second signal having a frequency which is lower than the lower limit frequency;
- the second signal is output to the vibrator concurrently with or prior to the first signal;
- the driving circuit outputs to the vibrator a synthesized signal obtained by adding together the first signal and the second signal while shifting a phase of the first signal and a phase of the second signal from each other; and
- the synthesized signal is a sine wave signal which is obtained by synthesizing together a plurality of groups of frequency signals, each group including a first pair of adjacent frequency signals and a second pair of adjacent frequency signals, the first pair of adjacent frequency signals being synthesized together in reverse phase, and the second pair of adjacent frequency signals being synthesized together in phase.

52. A portable terminal apparatus, comprising:
- a vibrator having a mechanical vibration system which resonates at a resonance frequency;
- an antenna for receiving an incoming call signal;
- a reception signal processing section for processing the incoming call signal so as to output an electric signal to the vibrator; and
- a driving circuit for driving the vibrator, wherein:
- the driving circuit outputs to the vibrator at least two signals of different frequencies which are included in a frequency range including the resonance frequency;
- the at least two signals include a first signal and a second signal;
- the driving circuit outputs to the vibrator a synthesized signal obtained by adding together the first signal and the second signal; and
- the synthesized signal is a sine wave signal which is obtained by synthesizing together a plurality of groups of frequency signals, each group including a first pair of adjacent frequency signals and a second pair of adjacent frequency signals, the first pair of adjacent frequency signals being synthesized together in reverse phase, and the second pair of adjacent frequency signals being synthesized together in phase.

53. A portable terminal apparatus, comprising:
- a vibrator having a mechanical vibration system having predetermined vibration force vs frequency characteristics;
- an antenna for receiving an incoming call signal;
- a reception signal processing section for processing the incoming call signal so as to output an electric signal to the vibrator; and
- a driving circuit for driving, the vibrator, wherein:
- the mechanical vibration system has different vibration force vs frequency characteristics for an increasing frequency sweep and, for a decreasing frequency sweep within a predetermined frequency range;
- the predetermined frequency range is defined between a lower limit frequency which represents a lowest frequency in the predetermined frequency range and an upper limit frequency which represents a highest frequency in the predetermined frequency range;
- the driving circuit outputs to the vibrator a first signal having a frequency within the frequency range and a second signal having a frequency which is lower than the lower limit frequency;
- the second signal is output to the vibrator concurrently with or prior to the first signal;
- the first signal includes a swept frequency signal whose frequency continuously varies over time;
- the first signal has a first turning frequency at which the frequency of the first signal stops increasing and starts decreasing and a second turning frequency at which the frequency of the first signal stops decreasing and starts increasing;
- the first turning frequency is lower than the upper limit frequency; and
- the second turning frequency is higher than the lower limit frequency.

54. A portable terminal apparatus, comprising:
- a vibrator having a mechanical vibration system having predetermined vibration force vs frequency characteristics;
- an antenna for receiving an incoming call signal;
- a reception signal processing section for processing the incoming call signal so as to output an electric signal to the vibrator; and
- a driving circuit for driving the vibrator, wherein:
- the mechanical vibration system has different vibration force vs frequency characteristics for an increasing frequency sweep and for a decreasing frequency sweep within a predetermined frequency range;
- the predetermined frequency range is defined between a lower limit frequency which represents a lowest frequency in the predetermined frequency range and an upper limit frequency which represents a highest frequency in the predetermined frequency range;
- the driving circuit outputs to the vibrator a first signal having a frequency within the frequency range and a second signal having a frequency which is lower than the lower limit frequency;
- the second signal is output to the vibrator concurrently with or prior to the first signal;
- the driving circuit outputs to the vibrator a synthesized signal obtained by adding together the first signal and the second signal while shifting a phase of the first signal and a phase of the second signal from each other; and
- the synthesized signal is a sine wave signal which is obtained by synthesizing together a plurality of groups of frequency signals, each group including a first pair of adjacent frequency signals and a second pair of adjacent frequency signals, the first pair of adjacent frequency signals being synthesized together in reverse phase, and the second pair of adjacent frequency signals being synthesized together in phase.

* * * * *